United States Patent
Johnson

(10) Patent No.: US 11,325,686 B2
(45) Date of Patent: May 10, 2022

(54) AUXILIARY SAIL SYSTEM FOR SHIPS AND SAFETY SYSTEMS FOR SAME

(71) Applicant: Alistair Johnson, Surrey (CA)

(72) Inventor: Alistair Johnson, Surrey (CA)

(73) Assignee: Alistair Johnson, Surrey (CA)

( * ) Notice: Subject to any disclaimer, the term of this patent is extended or adjusted under 35 U.S.C. 154(b) by 0 days.

(21) Appl. No.: 16/341,878

(22) PCT Filed: Dec. 14, 2017

(86) PCT No.: PCT/CA2017/051519
§ 371 (c)(1),
(2) Date: Apr. 12, 2019

(87) PCT Pub. No.: WO2018/068155
PCT Pub. Date: Apr. 19, 2018

(65) Prior Publication Data
US 2019/0263493 A1 Aug. 29, 2019

Related U.S. Application Data

(63) Continuation-in-part of application No. 15/784,148, filed on Oct. 15, 2017, now abandoned.

(60) Provisional application No. 62/408,733, filed on Oct. 15, 2016.

(51) Int. Cl.
*B63H 9/10* (2006.01)
*B63H 21/20* (2006.01)
*B63H 9/06* (2020.01)
*B63J 99/00* (2009.01)

(52) U.S. Cl.
CPC .............. *B63H 9/1092* (2013.01); *B63H 9/06* (2013.01); *B63H 9/10* (2013.01); *B63H 21/20* (2013.01); *B63J 99/00* (2013.01); *Y02T 70/5236* (2013.01)

(58) Field of Classification Search
CPC ... B63H 9/06; B63H 9/08; B63H 9/10; B63H 9/1092; B63H 2009/088
USPC .............. 114/102.1, 102.12, 102.15, 102.16, 114/102.29, 108, 112, 39.21, 39.29, 114/39.31, 39.32
See application file for complete search history.

(56) References Cited

U.S. PATENT DOCUMENTS

| | | | |
|---|---|---|---|
| 1,376,170 A | 4/1921 | Shann | |
| 3,085,539 A | 4/1963 | Prolss | |
| 3,608,511 A | 9/1971 | Katshen | |
| 3,626,883 A * | 12/1971 | Ellis | B63H 9/10 114/39.29 |
| 3,795,216 A | 3/1974 | MacPherson | |
| 4,116,152 A | 9/1978 | Larsson | |
| 4,448,144 A | 5/1984 | Senoo et al. | |
| 4,499,841 A | 2/1985 | Lord | |
| 4,503,797 A | 3/1985 | Maurin | |

(Continued)

FOREIGN PATENT DOCUMENTS

CN 205010455 U 2/2016
DE 2556802 A1 7/1977
(Continued)

*Primary Examiner* — Daniel V Venne
(74) *Attorney, Agent, or Firm* — Oyen Wiggs Green & Mutala LLP

(57) ABSTRACT

A ship-mounted auxiliary sail system featuring a plurality of sail units mountable and movable about the ship on a rail system. The sail units can have automatic reefing safety features and/or automatic mast release safety features.

20 Claims, 19 Drawing Sheets

FIG. 1

(56) References Cited

U.S. PATENT DOCUMENTS

| | | | |
|---|---|---|---|
| 4,702,191 A | 10/1987 | Minami et al. | |
| 5,197,401 A | 3/1993 | Finley et al. | |
| 5,485,799 A | 1/1996 | Julien | |
| 5,634,420 A | 6/1997 | Huisman | |
| 6,145,460 A | 11/2000 | Brookes | |
| 6,202,582 B1 | 3/2001 | Risley | |
| 6,953,000 B2* | 10/2005 | Fink | B63H 9/06 114/102.1 |
| 7,748,335 B1* | 7/2010 | Carne | B63H 25/38 114/56.1 |
| 8,424,477 B2 | 4/2013 | Burandt | |
| 8,776,708 B2 | 7/2014 | Cordier | |
| 9,345,762 B2 | 5/2016 | Dow et al. | |
| 9,371,121 B1 | 6/2016 | Jenkins et al. | |
| 9,376,187 B2* | 6/2016 | Atkinson | B63H 9/061 |
| 2011/0139052 A1 | 6/2011 | Burandt | |
| 2011/0303140 A1 | 12/2011 | Cordier | |
| 2012/0090520 A1* | 4/2012 | Kosugi | B63B 25/28 114/72 |
| 2014/0144362 A1 | 5/2014 | Atkinson | |
| 2015/0033998 A1 | 2/2015 | Englebert et al. | |
| 2015/0321745 A1 | 12/2015 | Bray | |
| 2016/0375971 A1* | 12/2016 | Salani | B63H 9/08 114/61.2 |
| 2018/0127075 A1* | 5/2018 | Johnson | B63J 99/00 |

FOREIGN PATENT DOCUMENTS

| | | |
|---|---|---|
| DE | 3121059 A1 | 12/1982 |
| DE | 3502670 A1 | 11/1986 |
| DE | 3644685 A1 | 4/1988 |
| DE | 3718414 A1 | 12/1988 |
| DE | 202005015888 U1 | 12/2005 |
| DE | 102008035071 B4 | 8/2010 |
| DE | 212015000159 U1 | 3/2017 |
| EP | 0183634 A1 | 6/1986 |
| EP | 0198577 A1 | 10/1986 |
| EP | 0319591 A1 | 6/1989 |
| EP | 1180478 A1 | 2/2002 |
| EP | 2398700 B1 | 10/2013 |
| FR | 2561613 A1 | 7/1986 |
| FR | 3026088 A1 | 3/2016 |
| GB | 152598 A | 7/1921 |
| GB | 888132 A | 1/1962 |
| GB | 1217587 A | 12/1970 |
| GB | 2381515 A | 5/2003 |
| HR | PK20131137 B3 | 2/2016 |
| IT | UA20162057 A1 | 9/2017 |
| JP | S58164495 A | 9/1983 |
| JP | S61135894 A | 12/1984 |
| JP | S60-94894 A | 5/1985 |
| JP | S61135895 A | 6/1986 |
| JP | S62-146800 A | 6/1987 |
| JP | 2012240540 A | 12/2012 |
| JP | 2014043142 A | 3/2014 |
| JP | 5865604 B2 | 2/2016 |
| KR | 20140070228 A | 6/2014 |
| KR | 10-1447868 B1 | 10/2014 |
| WO | 1987002003 A1 | 4/1987 |
| WO | 1999037573 A1 | 7/1999 |
| WO | 02044021 A1 | 6/2002 |
| WO | 2015197886 A1 | 12/2015 |

* cited by examiner

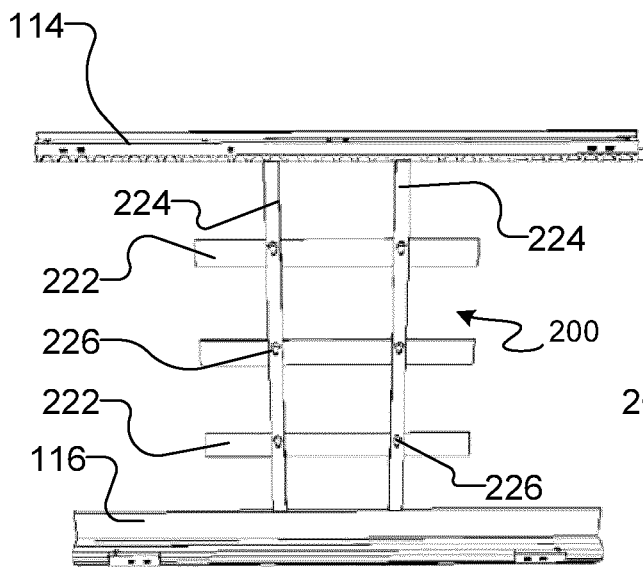
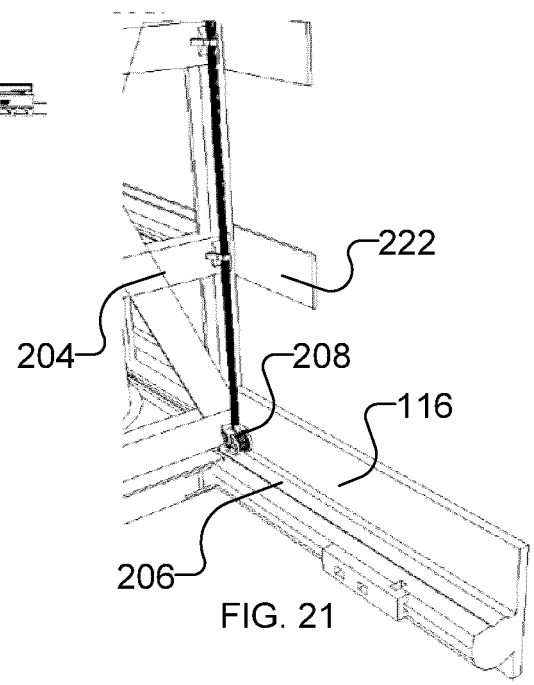
FIG. 20
FIG. 21
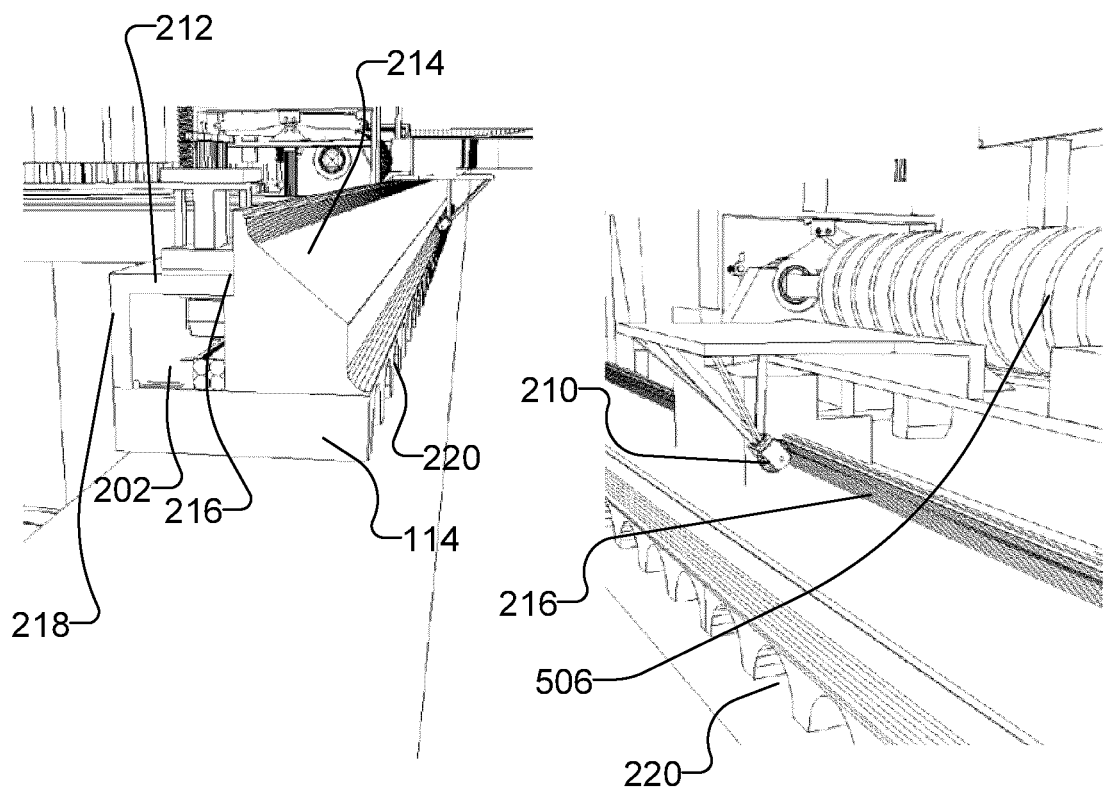
FIG. 22
FIG. 23

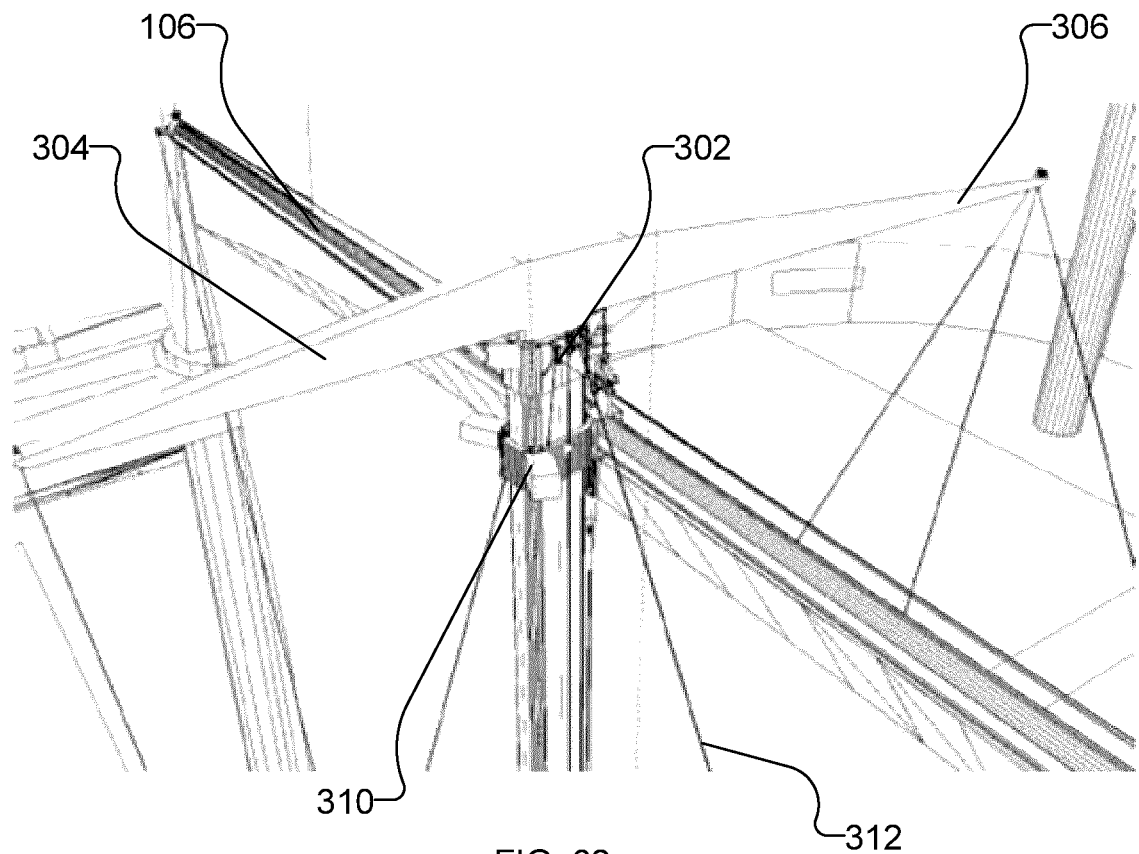
FIG. 32
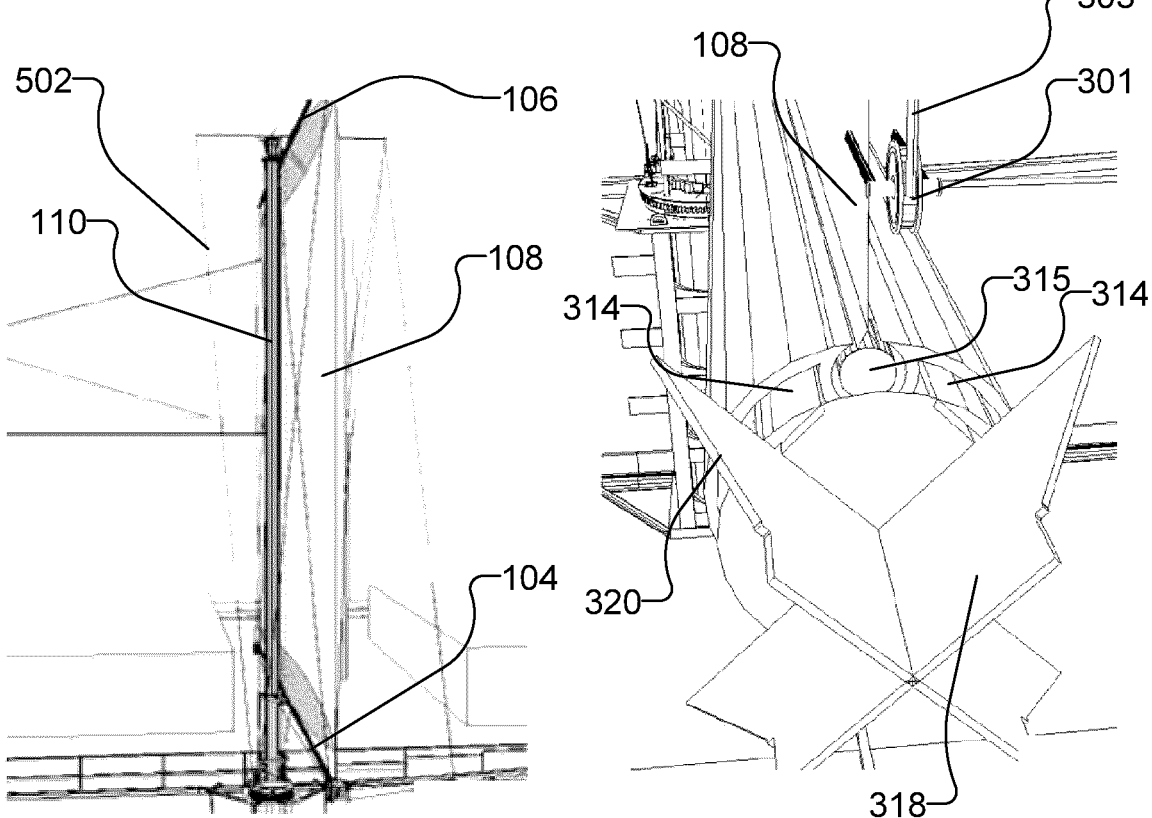
FIG. 33
FIG. 34A

AUXILIARY SAIL SYSTEM FOR SHIPS AND SAFETY SYSTEMS FOR SAME

REFERENCE TO RELATED APPLICATIONS

This application is a 371 national phase entry of Patent Cooperation Treaty patent application No. PCT/CA2017/051519, which claims priority to and is a continuation-in-part of U.S. patent application Ser. No. 15/784,148 filed 15 Oct. 2017, which claims the benefit of U.S. provisional patent application No. 62/408,733 filed 15 Oct. 2016. All of the foregoing applications are incorporated by reference herein in their entireties.

TECHNICAL FIELD

Some embodiments of the present invention relate to auxiliary sail systems for ships. Some embodiments of the present invention relate to auxiliary sail systems for ships that are mounted to be easily stowed or placed into an operating configuration.

Some embodiments of the present invention relate to auxiliary sail systems for ships that incorporate features allowing the sail area exposed to wind to be incrementally decreased. Some embodiments of the present invention relate to auxiliary sail systems for ships that incorporate features allowing the sail area exposed to wind to be rapidly decreased.

BACKGROUND

Sail on ships is an ancient technology. Historically at the advent of steam there were many hybrid sail/engine designs for ships built from scratch. There have only been a few attempts to reintroduce sail to conventionally powered merchant ships in recent times although the last commercial voyage of a fully sail driven ship was in 1957, to the best of the inventor's knowledge.

Some problems precluding practical implementation of 'sail on conventional ship' devices are the complexity of design, the expense and intrusiveness of installation, the lack of safety features to guard against sudden excessive winds, the obstruction that the device presents to the loading and unloading of cargo, and/or significant labour requirements for operating the devices. Further, known devices have not been designed with a view to retrofitting to existing ships, meaning that they can be installed only on newly constructed vessels.

There is a general desire for improved auxiliary sail systems for powered ships. It may be desirable to provide such systems wherein the auxiliary sails are securely mounted such that damage is avoided or minimized under the extreme conditions found at sea (e.g. in the open ocean). It may be desirable for an auxiliary sail system to easily and quickly be removed from an operational configuration to a stowed configuration, so that the regular dockside operations of the ship while it is in port are not impeded.

The foregoing examples of the related art and limitations related thereto are intended to be illustrative and not exclusive. Other limitations of the related art will become apparent to those of skill in the art upon a reading of the specification and a study of the drawings.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

One aspect of the invention provides a rail-mounted auxiliary sail system for a ship, e.g. a cargo ship. A rail system is provided that extends around at least a portion of the perimeter of the deck of the ship. A plurality of sail units mountable and movable on the rail system are provided. The rail system includes a plurality of fixed mounting points to which a respective one of the plurality of sail units can be fixed for use as an auxiliary sail to help drive the ship.

In one aspect, each one of the sail units has a base that can be fixed to the fixed mounting points, at least two rollers or wheels mounted to the base to allow the sail unit to move along the rail system, a mast mounted to the base, and a sail unit. In some aspects, the sail unit is a roller blind design of sail having an upper boom, a lower boom, and a square sail that can be raised and lowered to extend between the upper and lower booms. In some aspects, the sail is held in a fixed position with respect to the upper boom and the lower boom, the lower boom being rotatable so that the sail can be wound around the circumference of the lower boom. In the lowered configuration, the sail is wound about the lower boom, and the upper boom sits just above the lower boom. A reefing cable extends from a bobbin fixedly connected to the lower boom for rotation therewith to an upper portion of the mast and then to a top boom collar that is used to raise and lower the upper boom. In the lowered configuration, no or only a small portion of the reefing cable is wound about the bobbin.

In one aspect, to raise the sail, the upper boom is hoisted, for example using a hoisting cable supported from the top of the mast. The lifting of the upper boom unfurls the sail from the lower boom, causing the sail to be released and correspondingly causing the reefing cable to be wound round the bobbin as the top boom collar rises on the mast. To lower the sail, the upper boom is lowered, for example by allowing the hoisting cable to lower the upper boom. A corresponding force is exerted on the reefing cable causing it to both be unwound from the bobbin and to rotate the lower boom, so that slack produced in the sail as it is lowered is taken up and wound around the lower boom.

In one aspect, an automatic reefing safety feature is provided. A flex detecting cable is provided to detect flexion in the upper boom caused by an extreme wind event. The flex detecting cable is connected to a damping member that absorbs the forces applied by the flex detecting cable during normal sailing operations. The damping member can be an inertia drum. During an extreme wind event, the damping member cannot absorb the force applied by the flex detecting cable, and this force is transferred to actuate a lever that releases a latch that ordinarily secures a top boom cable drum against rotation. When the latch is released, the top boom cable drum is permitted to rotate, and the top boom cable that is connected to raise and lower the top boom is permitted to unwind or move with the rotation of the top boom cable drum to lower the top boom.

Once the force applied by the extreme wind event subsides, the automatic reefing safety feature is no longer activated, and the latch is biased back to its ordinarily securing position to secure the top boom cable drum against rotation. Thus, in some aspects, the top boom cable drum is permitted to rotate once in response to an extreme wind event. In some aspects, the circumference of the top boom cable drum about which the top boom cable is wound is equivalent to about $\frac{1}{10}^{th}$ of the height of the mast, so that activation of the automatic reefing safety feature results in a reefing of the sail by $1/10^{th}$ of its height.

In one aspect, a mast rotation release safety feature is provided. The mast is mounted on a rotatable platform that is ordinarily engaged with an engagement member operable to rotate the mast to its desired position. A sensing cable is attached to the mast to detect extreme wind events that cause greater than a predetermined degree of flexion of the mast. The sensing cable is configured to actuate a mechanical switch once more than the predetermined degree of flexion of the mast is detected. In one aspect, actuation of the mechanical switch releases a weight that is configured to raise the rotatable platform out of engagement with the engagement member, to thereby allow the rotatable platform to freely rotate so that a sail affixed to the mast is permitted to be placed into a configuration parallel with the prevailing wind, to thereby rapidly release the force applied to the sail and to the mast.

In one aspect, a chain tensioner is provided to regulate actuation of the mechanical switch. A spring within the chain tensioner has a spring constant selected to damp ordinary forces applied by the sensing cable during normal sailing operations. Once more than a predetermined level of force is exerted by the sensing cable, the spring allows a retaining member within the chain tensioner to be forced into a locked position, which locks an activating finger into a rigid position that moves the mechanical switch to the actuated configuration. Movement of the mechanical switch to the actuated configuration moves a pin from a secured position to a release position to release the weight and thereby lift the rotatable platform out of engagement with the engagement member to allow the rotatable platform to freely rotate.

In one aspect, activation of the mast rotation release safety system activates an automatic full reefing of the sail. In one aspect, the sail incorporates an automatic reefing safety system as heretofore described, and actuation of the mechanical switch by the mast rotation release safety system activates the latch that ordinarily secures the top boom cable drum against rotation to be moved to its released configuration and held there. This allows the top boom cable drum to freely rotate for as many rotations as are required to drop the top boom, and hence the sail, to its fully lowered position.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced figures of the drawings. It is intended that the embodiments and figures disclosed herein are to be considered illustrative rather than restrictive.

FIG. 20 shows an example embodiment of a mounting point for affixing the sail units in place for use.

FIG. 21 shows a perspective view of an example embodiment of a bottom rail.

FIG. 22 shows a perspective view of an example embodiment of a top rail.

FIG. 23 shows an example embodiment of the engagement of a base unit of a sail unit with the top rail.

FIG. 32 shows an example embodiment of a top boom support.

FIG. 33 shows example embodiments of mast strengthener cables.

FIG. 34A shows a detailed view of a lower boom in one example embodiment.

FIG. 47 shows the switch in the unactuated configuration and FIG. 48 shows the switch just approaching the actuated configuration, prior to the mast release weight being dropped.

FIGS. 49 and 51 show the normal operating position of the mast cog, and FIGS. 50 and 52 shows the raised position of the mast cog when the automatic mast rotation release safety feature is activated.

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

Figure 1:
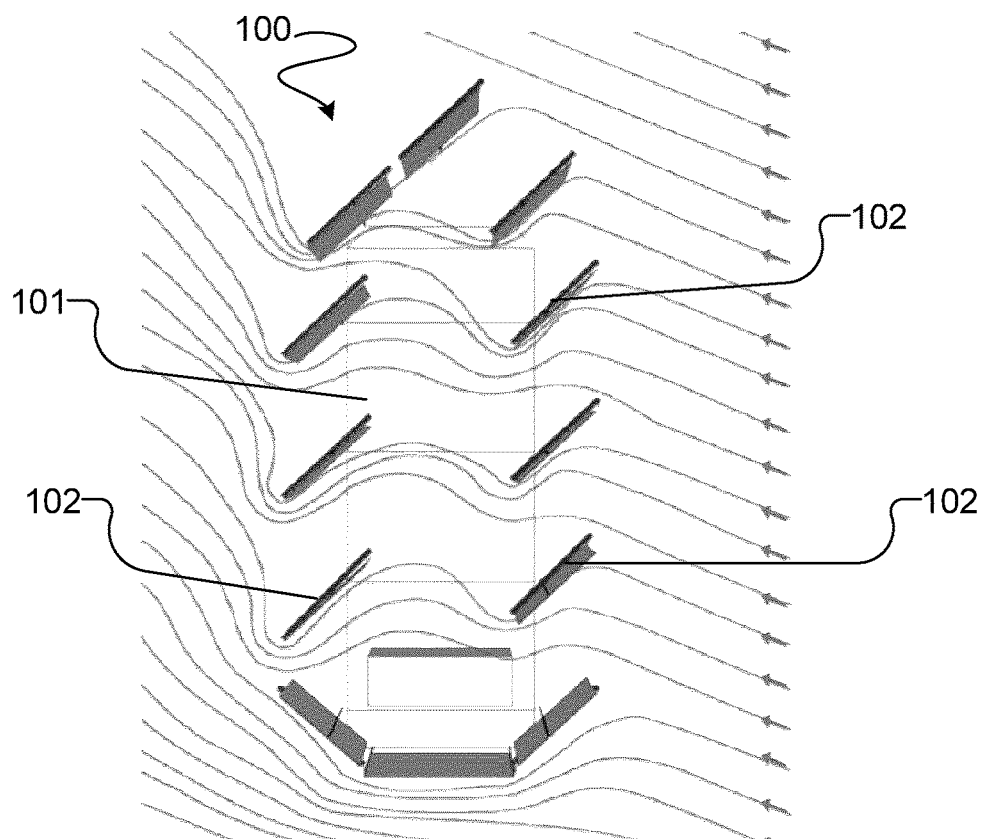
FIG. 1 is a top view of a ship equipped with an example embodiment of an auxiliary sail system.

With reference to FIG. 1 in which the wind direction is illustrated by arrows and the air flow by curved lines, one example embodiment of a rail-mounted auxiliary sail system 100 is illustrated on a ship 101 with the sails 108 in their deployed configuration. Rail-mounted auxiliary sail system 100 includes a plurality of sail units 102. Sail units 102 are mounted about the perimeter of ship 101 on its hull, so that the main cargo area of the ship 101 is left generally clear, e.g. for carrying cargo and the like.

Rail-mounted auxiliary sail system 100 provides fuel savings for ships with which it is used. Without being bound by theory, using theoretical sail area to displacement calculations and a model recently wind tunnel tested by the inventor, fuel savings as compared with running on a ship's existing engines alone were estimated to be up to 25%. It is believed that in some embodiments this may translate into a typical savings of fuel across a shipping route on the order of 10%. In some embodiments, rail-mounted auxiliary sail system 100 is used to assist in maneuvering and/or stopping a ship.

In some embodiments, a plurality of sail units 102 are deployed along the sides of the hull of ship 101. In the illustrated embodiment of FIGS. 2-5, auxiliary sail system 100 is installed on a Green Dolphin 575 Handmax. In the illustrated embodiment, rail-mounted auxiliary sail system 100 has nineteen sail units 102. Any suitable number of sail units 102 could be used in alternative embodiments, including between 1 and 25 sail units or any number or interval therebetween, e.g. 2, 4, 6, 8, 10, 12, 15, or 20 sail units 102. In the illustrated embodiment in the operating configuration, nine sail units 102 are provided on each side of ship 101, and one sail unit 102 is provided at the bow of ship 101.

The size and position of sail units 102 can be determined by one skilled in the art depending on the type of ship on which the sail units 102 are installed. The distance between adjacent pairs of sail units 102 must be sufficient to allow their booms to rotate fully without interfering with one another, e.g. in embodiments in which upper and lower booms 106, 104 have a length of approximately 15.6 m, a spacing interval of at least 16.5 m should be provided between adjacent sail units 102 to avoid interference therebetween.

Figure 56:
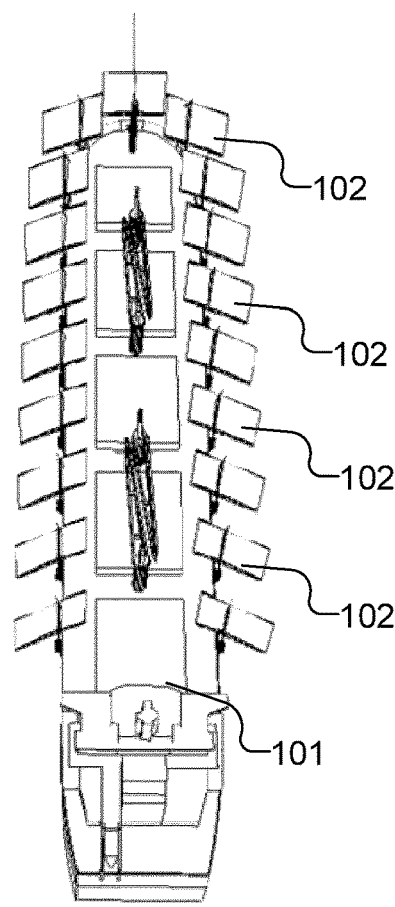
FIG. 56 (drawing sheet 15/19) shows the sail units in a chevron configuration.

In some embodiments, sail units 102 are rotated such that the array of sails formed thereby are erected in a chevron configuration, with all sails pointing inwards towards the bow as shown in FIG. 56. Such a configuration may be desirable e.g. when the wind is blowing from directly behind ship 101, which can avoid a need for tacking. The chevron configuration also allows for the further use of additional auxiliary sails if desired, e.g. a spinnaker or other similar sail, such as the SkySail used on the MS Beluga SkySails.

In the illustrated embodiment, sail units 102 are square-rigged sails 108. In some embodiments, the square-rigged sails 108 have a surface area of between 100 m$^2$ and 300 m$^2$, including any value therebetween, e.g. 120, 140, 160, 180, 200, 220, 240, 260 or 280 m$^2$. In alternative embodiments, any desired sail surface area could be used. In alternative embodiments, any desired type of sail could be used in place of square-rigged sails, for example aircraft-wing style sails, Flettner rotors, conventional sails, or the like.

Figure 2:
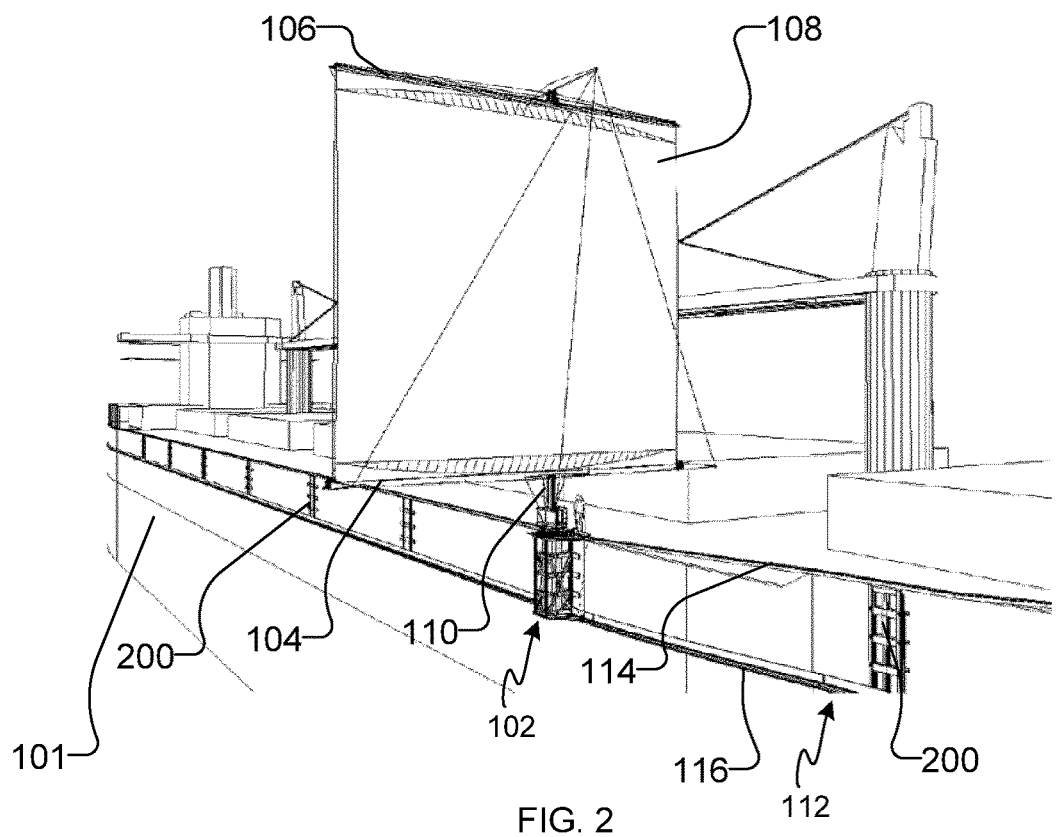
FIG. 2 is a partial perspective view showing an example embodiment of a sail unit.

As best seen in FIG. 2 in which like reference numerals refer to like components of the embodiment shown in FIG. 1, each sail unit 102 has a lower boom 104, an upper boom 106, a square sail 108, and a mast 110. Mast 110 extends vertically above the deck of ship 101 to support square sails 108, and upper and lower booms 106, 104 extend generally horizontally so that sail 108 extends therebetween. Upper boom 106 can be raised and lowered vertically along mast 110 to thereby raise and lower square sail 108 as explained in greater detail below.

Each sail unit 102 is supported for movement about the outer deck of ship 101 along a rail system 112. In the illustrated embodiment, rail system 112 has a top rail 114 that runs along at least a portion of the outer deck of ship 101, and a bottom rail 116 that extends parallel to and at a lower elevation than top rail 114. A plurality of spaced apart fixed mounting points 200 are provided about rail system 112 so that sail units 102 can be secured in position for use at any desired mounting point 200.

Figure 3:
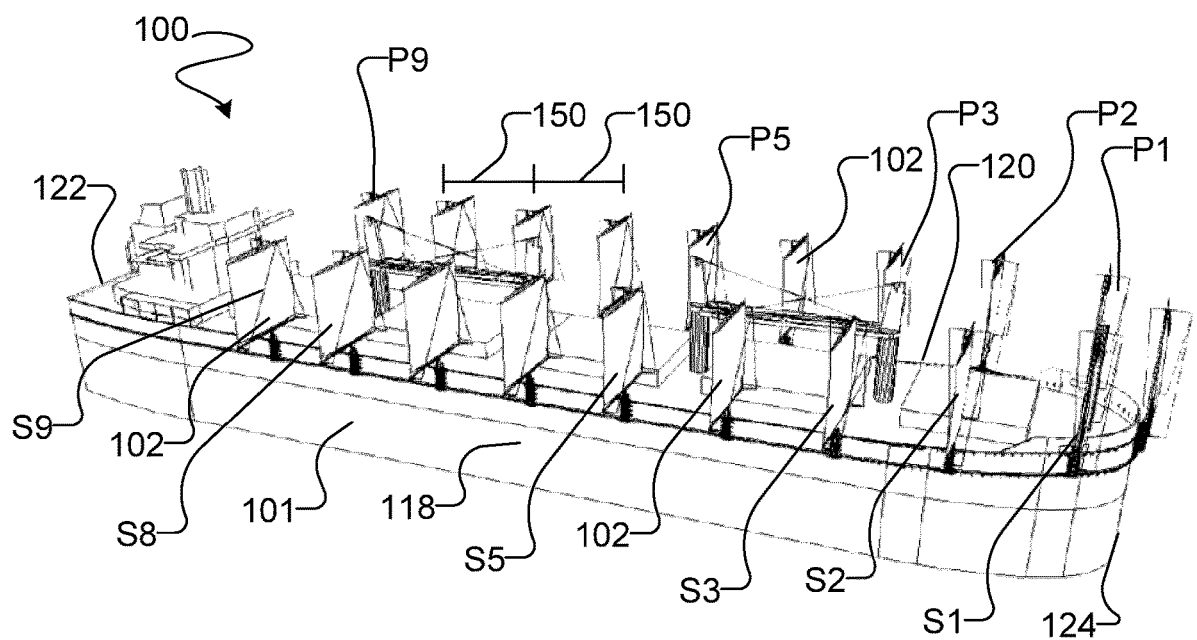
FIG. 3 is a perspective view of a ship equipped with an example embodiment of an auxiliary sail system, with the auxiliary sail system in its fully deployed configuration but with the sails raised.
Figure 4:
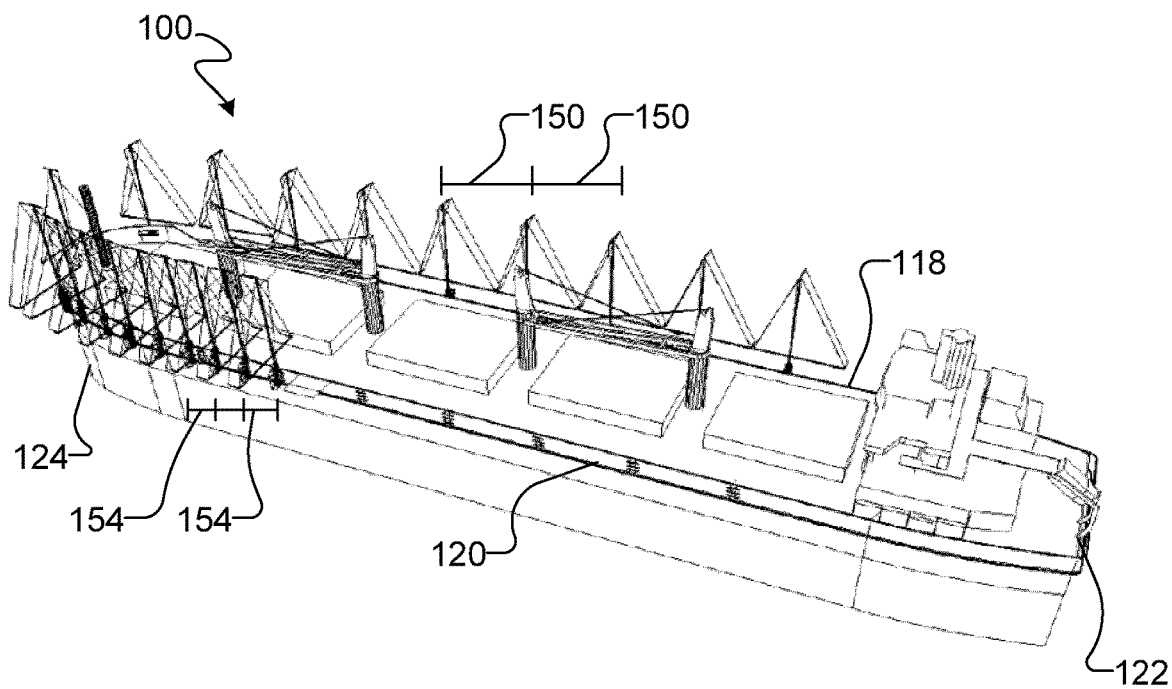
FIG. 4 is a perspective view of the example embodiment of FIG. 3, with the port sail units gathered.
Figure 5:
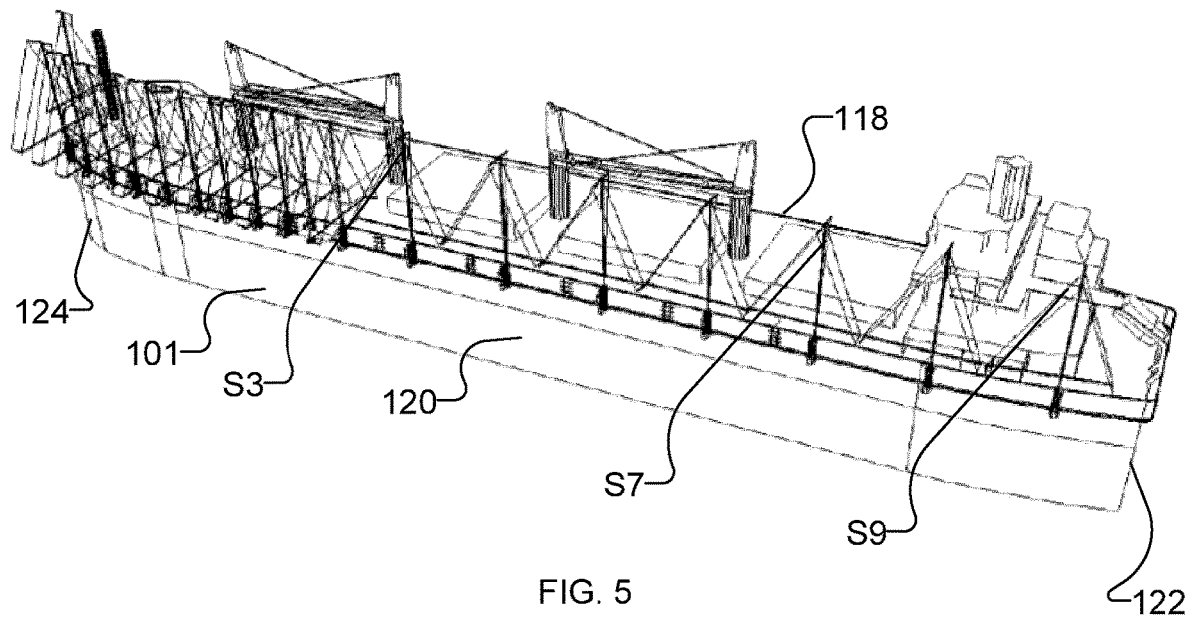
FIG. 5 is a perspective view of the example embodiment of FIG. 3, with the starboard sail units drawn fully round and the stern clear of sail units.
Figure 7:
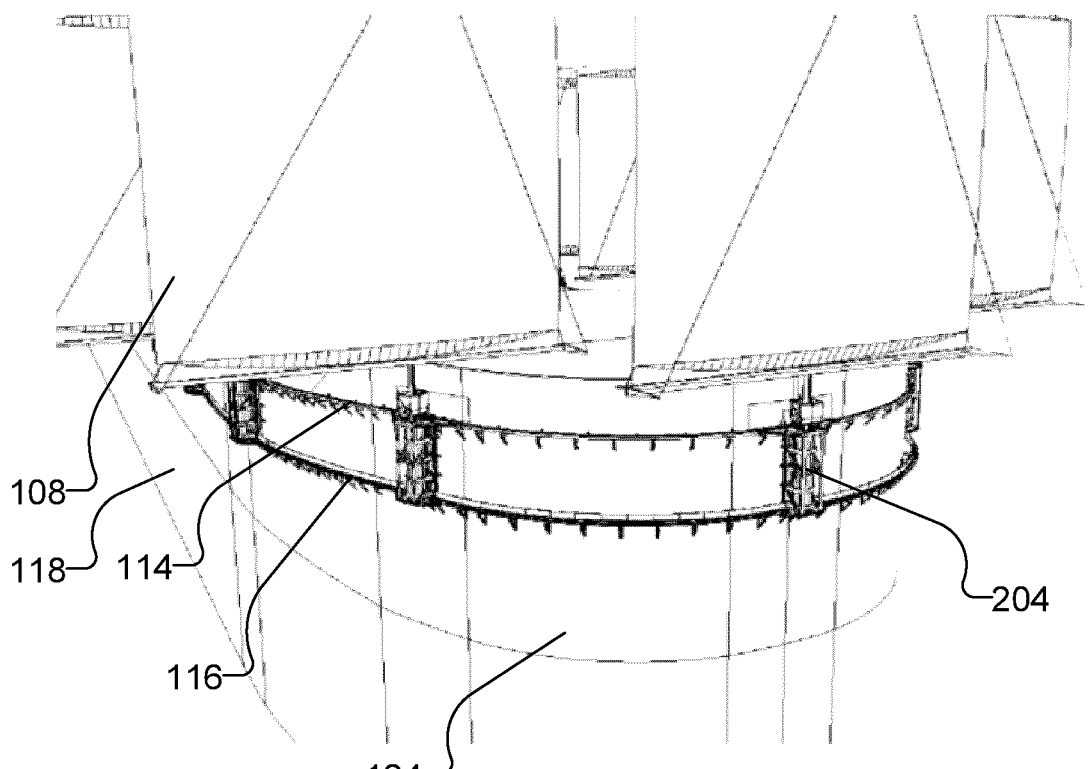
FIG. 7 shows an example embodiment of a ship having a continuous rail system that extends around the bow of the ship.

As best seen in FIGS. 3-5, sail units 102 can be slid along rail system 112 to move about the outer circumference of the ship's deck. In the illustrated embodiment of FIG. 7, rail system 112 runs in a continuous manner about the starboard side 118, port side 120, stern 122 and bow 124 of ship 101. In alternative embodiments, rail system 112 can be discontinuous, for example, extending only along the starboard side 118 and port side 120, extending only partially along starboard side 118 and partially along port side 120, extending in two separate sections along starboard side 118 and two separate sections along port side 120, extending in addition to any of the foregoing variations independently along stern 122, extending continuously around stern 122 and only a portion of starboard side 118 and only a portion of port side 120, and so on. Generally, rail system 112 will extend along at least a portion of port side 120, a portion of starboard side 118, and fully around stern 122, to allow sail units 102 to be fully removed from either side of ship 101.

Figure 6:
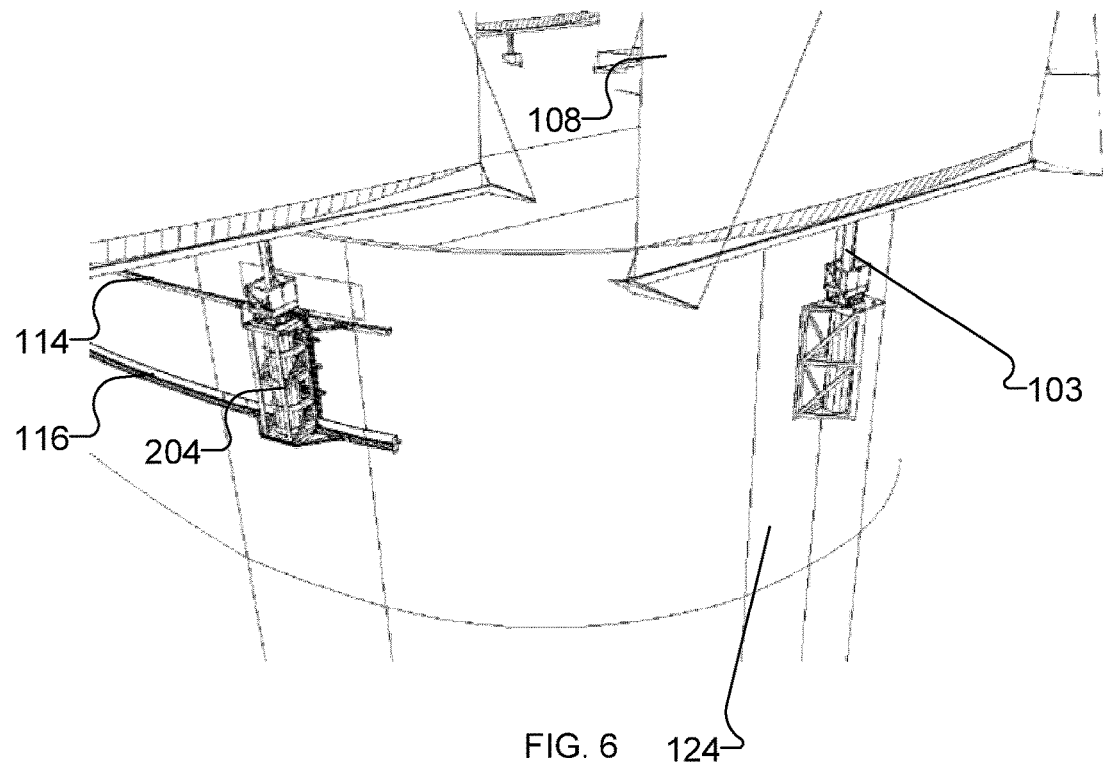
FIG. 6 shows an example embodiment of a ship having a discontinuous rail system, with an independently mounted auxiliary bow-mounted sail unit.

FIG. 6 shows an example embodiment in which rail system 112 is discontinuous. Rail system 112 extends around the port side, stern, and starboard side of ship 101 in the embodiment of FIG. 6, but does not extend continuously around the bow 124 of ship 101. In this embodiment, an auxiliary bow-mounted sail unit 103 is provided. Auxiliary bow-mounted sail unit 103 is not mounted to rail system 112, but is independently mounted at a specific point on the hull of ship 101 at bow 124 using a pocket-mounting system, i.e. a fixed mounting at a specific point on the hull of ship 101, independent of rail system 112. Auxiliary bow-mounted sail unit 103 cannot be moved along rail system 112, but must be separately installed and uninstalled as desired.

As can be seen from FIGS. 4 and 5, the sail units 102 can be moved along rail system 112 to be selectively cleared out of the way, for example for stowage when sail units 102 are not required, or to clear the sides of ship 101 so that dockside operations (e.g. loading and unloading of cargo) can be undertaken. FIG. 5 illustrates a configuration in which the sail units 102 have been cleared from both the starboard side 118 and stern 122 of ship 101, so that dockside operations can be carried out on the starboard side 118 of ship 101 in port. In some embodiments, ship 101 is lashed to shore with ropes running across the stern 122.

Figure 8:
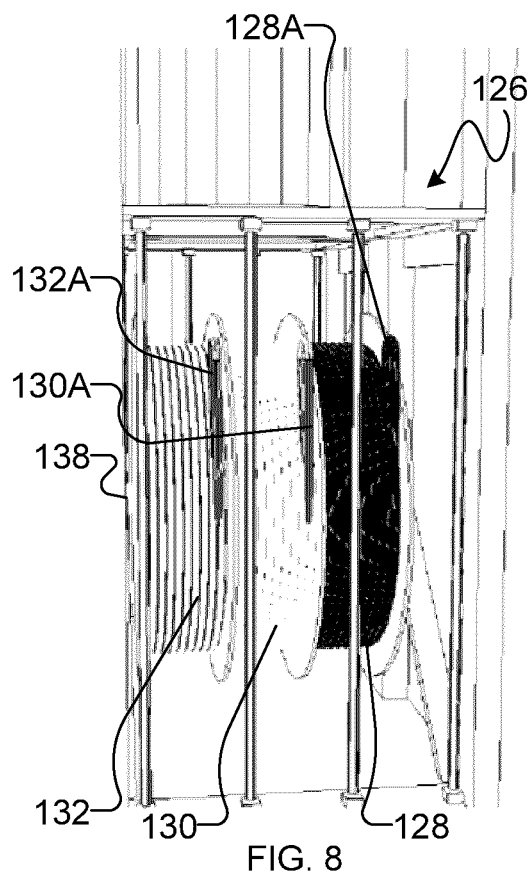
FIG. 8 shows an example embodiment of a spool holding three ropes for use in moving the sail units about the ship in accordance with an example embodiment.

In the illustrated embodiment, sail units 102 are moved along rail system 112 using a rope system 126. In one example embodiment illustrated in FIG. 8, rope system 126 has three ropes, first rope 128, second rope 130, and third rope 132, wherein the first and second ropes 128, 130 can be lashed together as described below to provide a drive rope. The first, second and third ropes 128, 130 and 132 are initially provided wound round spools 138 provided near the bow 124 of ship 101, as shown in FIG. 8.

Figure 9A:
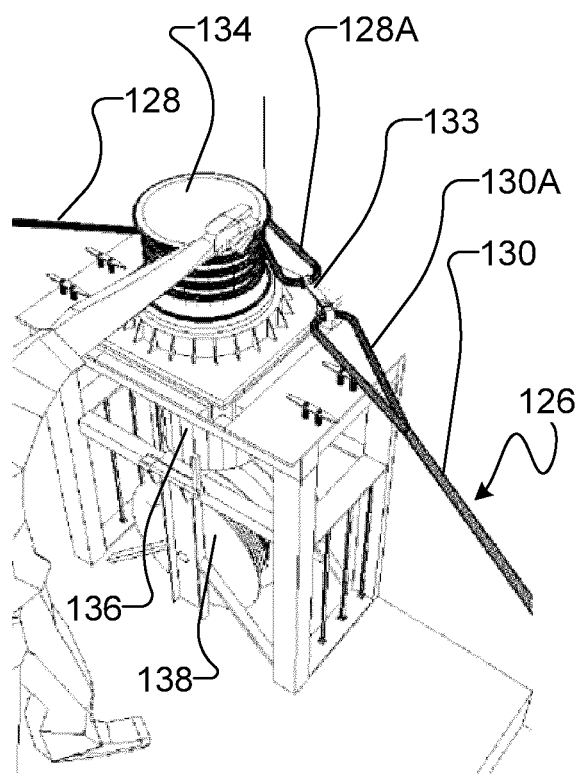
FIG. 9A shows an example embodiment of a motorized capstan with rope spools positioned below.

In one example embodiment, first, second and third ropes 128, 130 and 132 have looped ends 128A, 130A and 132A provided at each of their free ends, as best seen in FIG. 9A.

Rope system 126 is moved to move sail units 102 about the deck of ship 101 using a capstan 134 that is rotated by a motor 136 (FIG. 9A). In the illustrated embodiment, capstan 134 is mounted at the bow 124 of ship 101 and first, second and third ropes 128, 130, 132 are stored below capstan 134 on spools 138. In alternative embodiments, capstan 134 can be mounted in any desired location and first, second and third ropes 128, 130, 132 can be stored in any suitable location.

Rope system 126 is operated to move sail units 102 about rail system 112. In one example embodiment, sail units 102 are moved along rail system 112 so that they will not interfere with dockside operations. Sail units 102 can be moved at any suitable time to prepare for dockside operations, e.g. during the ship's run into port, or in the port itself.

Figure 9B:
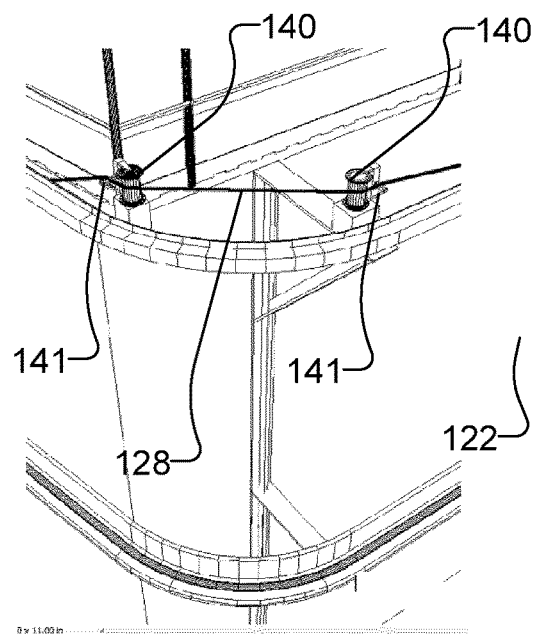
FIG. 9B shows an example embodiment of rollers as used to direct the rope system about the stern of the ship.

To move sail units 102 about rail system 112, first rope 128 (which may be indicated by being of a particular colour to assist operators in correct use of rope system 126, e.g. black in one example embodiment, is wound around capstan 134 and run around a portion of the perimeter of ship 101. Appropriate structural elements such as rollers 140, 141 are used at appropriate locations (e.g. about the stern of ship 101) to ensure that first rope 128 has a smooth path of travel about ship 101, e.g. as shown in FIG. 9B.

The first looped end 128A of first rope 128 is lashed to the first looped end 130A of second rope 130 (which may also be indicated by being of a particular colour to assist operators in the correct use of rope system 126, e.g. white in one example embodiment) to form a continuous cable that acts as a drive rope, e.g. as shown in FIG. 9A. In one example embodiment, a hook and loop fastener 133 is used to lash the free looped ends of the ropes together.

Figure 10:
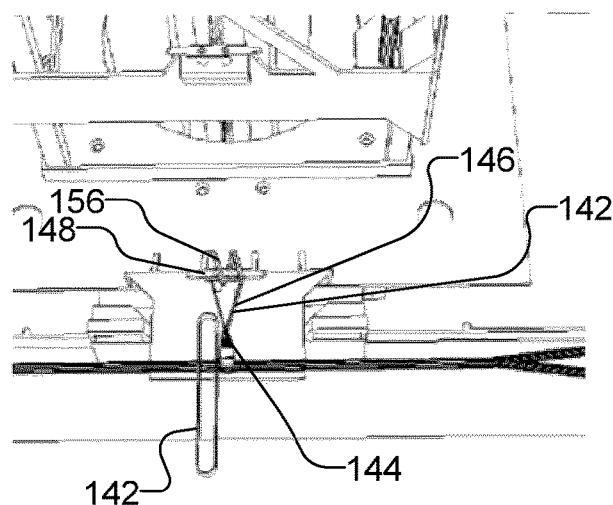
FIG. 10 shows an example embodiment of attaching a sail unit to a rope.

Sail units 102 are lashed to the first and second ropes 128, 130 using cinched straps that can be looped over horn cleats 148 provided at suitable locations on sail units 102, e.g. as shown in FIG. 10. As shown inset in FIG. 10, a simple webbing loop 142 can be cinched onto a rope (e.g. rope 128, 130 or 132) of rope system 126 by passing the webbing loop 142 about the rope and feeding a first end of webbing loop 142 through its opposite end. Webbing loop 142 can then be cinched tightly around the rope to provide a securing end 144, and the opposite free end 146 of webbing loop 142 can be secured around a horncleat 148 provided at a suitable location on sail unit 102.

To adjust the position of sail units 102 on rail system 112, for example to provide for dockside clearance, in some embodiments, a third rope 132 (which may also be indicated by being of a particular colour to assist operators in the correct use of rope system 126, e.g. yellow in one example embodiment) is used. Sail units 102 can be coupled to third rope 132 to allow for their movement using simple webbing loop 142 in the same manner as described above to secure third rope 132 to the horncleat 148 of the relevant sail unit 102. Third rope 132 can then be used to gather sail units 102 on a first side of ship 101 closer together, allowing the sail units 102 on the second, dockside, side of ship 101 to be drawn around ship 101 and out of the way of desired dockside activities, as described in greater detail below for one example method of operation. Thus, third rope 132 functions as a storage rope.

In one example embodiment of 19 sail units installed on a GD 575 ship, it is anticipated that the entire operation to clear the sail units from the dockside (referred to as a "curtain operation") will not take more than 30 minutes for two crew members to complete.

Figure 11:
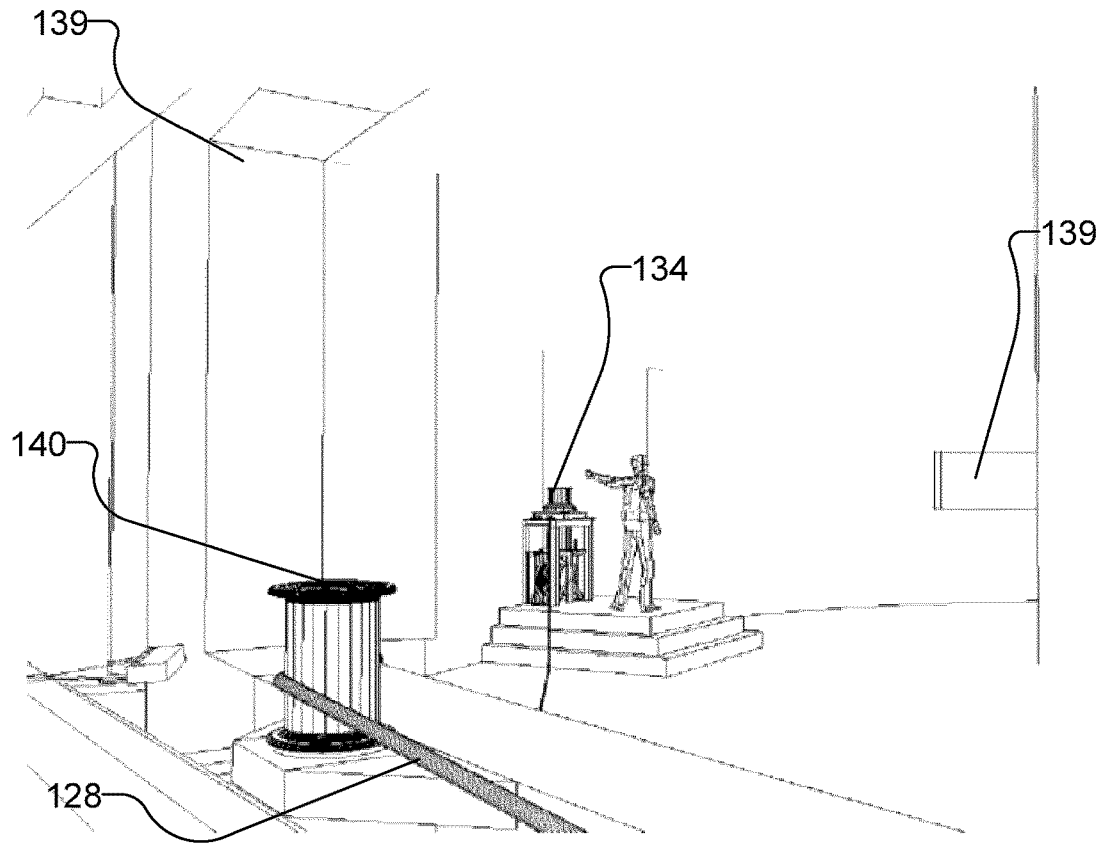
FIG. 11 shows an example embodiment of drawing a rope out of the bow of the ship.

In one example embodiment, a method of loading a plurality of sail units 102 onto a ship 101 is provided. The two bow doors 139 of the ship are opened as shown in FIG. 11 and crew members go to the capstan 134 and rope spools 138 on the bow platform of ship 101. Black rope 128 is drawn off spool 138 and is passed over the bow of ship 101 and/or through the bow door 139 (in this example embodiment, the port bow door) in any suitable manner, for example using boat hooks to grasp the first looped end 128A of first rope 128 as it is fed through the bow door. First rope 128 is drawn round the side of the ship, in the space between the hand rail of the ship and a top rail of the sail units 102 in this example embodiment, with appropriate rollers 140 and/or side rollers 141 positioned at any locations where guidance or redirection of the rope is necessary or desirable.

At the stern 122 of ship 101, as shown in FIG. 9B, first rope 128 is laid round the stern rollers 140, including over side rollers 141 that support first rope 128 in the vertical direction. In this exemplary embodiment, first rope 128 is drawn around the port side 120 and up the starboard side 118 to the "S9" position, i.e. the position which will be occupied by the ninth sail unit 102, as counted starting with the first sail unit 102 on the starboard side 118 at bow 124.

Second rope 130 is drawn around the opposite side of ship 101 to meet first rope 128, e.g. out the starboard bow door 139, in a similar manner. In this example embodiment, second rope 130 is drawn down the starboard side 118 to the "S9" position to meet black rope 128. Both ropes 128, 130 are held slack on horn cleats provided on the assembly that supports capstan 134, or at any suitable location on the bow 124 of the ship until the crew can secure first rope 128 about capstan 134, and secure the looped ends 128A, 130A of first rope 128 and second rope 130 by lashing them together in any suitable manner.

The first looped ends 128A, 130A of first rope 128 and second rope 130 are lashed together at their meeting point, e.g. at the "S9" position in this example embodiment, in any suitable manner. In this example embodiment, the two ropes are lashed together using a hook-and-loop (e.g. Velcro™) strap 133. The slack in first rope 128 is taken up and wound round capstan 134, and the second looped end 128A of first rope 128 is coupled to the second looped end 130A of second rope 130 at the bow of the ship in any suitable manner, e.g. using a hook-and-loop strap 133 in this example embodiment. Thus, first rope 128 and second rope 130 form one continuous rope when their free looped ends 128A, 130A are lashed together in this manner.

Sail units 102 are spaced apart from each other along the sides of ship 101 by any suitable spacing distance 150 (FIGS. 3 and 4). The spacing distance 150 between each pair of adjacent sail unit 102 can be but need not be the same or approximately the same distance between each pair of adjacent sail units 102 along each side of ship 101. In this exemplary embodiment, the spacing of sail units 102 along each of starboard side 118 and port side 120 is approximately 16.5 m. In some embodiments, first and second ropes 128, 130 are marked with distance indicators, for example a double ring marker 151 (shown schematically in FIG. 14) around the rope at the appropriate location, to assist in the proper positioning of sail units 102 along ropes 128, 130.

In this example embodiment, a first double ring marker is provided at the spacing distance 150 along second rope 130, i.e. at 16.5 m in this example embodiment. The combined first/second rope 128, 130 is drawn back on capstan 134 until the first double ring marker is drawn adjacent the point at which the sail units 102 are to be loaded on the rail system 112. In this example embodiment, the sail units are to be loaded at the S3 position (i.e. the third sail position from bow 124 along starboard side 118).

The sail unit 102 that will be located at the P1 position (i.e. the first position at the bow 124 of ship 101 on the port side 120) is loaded first at the S3 position, and is lashed to second rope 130 at the first double ring marker using a simple webbing loop 142 that is cinched over second rope 130 at its securing end 144 and secured to the P1 sail unit 102 by securing the free end 146 of webbing loop 142 about the horncleat 148 provided on the P1 sail unit 102.

The length of simple webbing loop 142 is selected to be sufficient to provide sufficient play (i.e. freedom of movement) of sail unit 102 so that it can be moved along rail system 112 and into the desired position about ship 101. For example, it is anticipated that in many embodiments, webbing loop 142 will need to provide sufficient play to allow each sail unit 102 to be moved around the corners at the stern 122 of ship 101.

With the P1 sail unit 102 secured to second rope 130 at the first double ring marker, the P1 sail unit 102 is drawn along rail system 112 on starboard side 118 towards stern 122 by the desired spacing distance 150 relative to the next adjacent sail unit 102, which will be the P2 sail unit 102 in this example embodiment. In this example embodiment, spacing distance 150 between the P1 and P2 sail units 102 is 16.5 m, and so the next double ring marker along second rope 130 is provided at a spacing distance 150 of 16.5 m from the first double ring marker. The P1 sail unit 102 is thus drawn along starboard side 118 by a distance of 16.5 m, so that the P2 sail unit 102 can be secured to second rope 130 at the desired spacing distance 150 from the P1 sail unit 102.

This process is repeated until all of the port side sail units (P1 through P9 in this example embodiment) are coupled to second rope 130 at the desired spacing distance 150 from one another on the starboard side.

The port side sail units are then drawn around the stern 122 of the ship 101 with their sails in a movement configuration (i.e. with upper and lower booms 106, 104 oriented generally parallel to the side of ship 101) until the first sail unit reaches the P1 position using rope system 126 actuated by capstan 134. Each one of the sail units 102 P1 through P9 are then lowered into position and secured in place on their respective mounting points 200 as described below. In the illustrated embodiment, each one of sail units 102 P1 through P9 are released from second rope 130 by removing the free end 146 of webbing loop 142 from horncleat 148 and removing the securing end 144 of webbing loop 142 from second rope 130.

At this stage, and in this example embodiment, the lower and upper booms 104, 106 of the port side sail units 102 can be turned through 90° so that square sails 108 will be oriented perpendicular to the port side 120 of ship 101, which is the initial configuration in which sail units 102 would be deployed for use.

After the port side sail units 102 have been released (P1 through P9 in this example embodiment), the continuous drive rope 128/130 is drawn around ship 101 using capstan 134 until the a double ring marker on white rope 130 is again adjacent the loading position for sail units 102, i.e. at the S3 position in this example embodiment.

The first starboard sail unit 102 that will occupy the S1 position (i.e. the position on the starboard side 118 closest to bow 124) is then loaded at the loading position (i.e. the S3 position in this example embodiment) and lashed to second rope 130 at the first double ring marker. Because the S1 sail unit 102 does not need to navigate the corners at the stern 122 of ship 101, in some embodiments a shorter simple webbing loop 142 can be used for loading the starboard side sail units than was used for loading the port side sail units, which did have to navigate the stern 122 of ship 101.

Once the S1 sail unit 102 has been lashed to second rope 130, capstan 134 is actuated to draw the S1 sail unit towards bow 124 by the predetermined spacing distance 150 (i.e. 16.5 m in this example embodiment). Once the second double ring marker reaches the loading position (i.e. the S3 position in this example embodiment), the sail unit 102 that will occupy the S2 position is loaded and lashed to second rope 130 at the second double ring marker, and both the S1 and S2 sail units 102 are drawn towards bow 124 in the movement configuration until the S1 sail unit reaches the S1 position. Both the S1 and S2 sail units 102 are then lowered onto rails 112, and are deployed and locked into position on their respective mounting points 200 as described below, and the S1 and S2 sail units are unlashed from second rope 130 by removing webbing loops 142.

At this stage, and in this example embodiment, the lower and upper booms 104, 106 of the S1 and S2 sail units 102 can be turned through 90° so that square sails 108 will be oriented perpendicular to the starboards side 118 of ship 101, which is the initial configuration in which sail units 102 would be deployed for use.

Capstan 134 is then actuated to return the first double ring marker to the loading position (i.e. the S3 position in this example embodiment). Each of the remaining S9 through S3 sail units 102 is then loaded and lashed to second rope 130 at the appropriate spacing distance 150 and drawn towards the stern 122 of ship 101 in the movement configuration until all of the S3 through S9 sail units are in position. The S3 through S9 sail units 102 are then lowered, locked and released and their upper and lower booms 104, 106 can be turned through 90° so that square sails 108 will be oriented perpendicular to the starboards side 118 of ship 101, which is the initial configuration in which sail units 102 would be deployed for use.

In embodiments in which an auxiliary bow-mounted sail unit 103 is used, auxiliary bow-mounted sail unit 103 is mounted at the bow at any desired time during the loading sequence of sail units 102, e.g. before, after or during the loading of sail units 102 onto rail system 112. In one example embodiment, the auxiliary bow-mounted sail unit 103 is mounted on a bow cradle provided at the bow 124 of ship 121 after the first sail unit 102 (e.g. the P1 sail unit 102 in this described example embodiment) has been mounted on rail system 112 and cinched to white rope 130.

An example embodiment of a method for clearing some or all of the sail units 102, for example in preparation for engaging in dockside operations such as loading or unloading ship 101, is now described. This example embodiment is described with reference to clearing sail units 102 from the starboard side 118 of ship 101, but with appropriate modifications could be used to clear sail units 102 from the port side 120.

As a first step, the upper and lower booms 106, 104 of the starboard side sail units are rotated from their deployed configuration, i.e. an orientation in which the upper and lower booms 106, 104 extend generally perpendicularly to the side of the ship 101, as shown in FIG. 3, to a movement configuration, i.e. are turned so that they extend in parallel to the starboard side 118 of ship 101, e.g. as shown for the starboard-side sail units 102 in FIG. 4.

In some embodiments, third rope 132, which can be referred to as a storage rope, is provided with double ring markers 152 (shown schematically in FIGS. 12 and 13) at predetermined stowage spacing intervals 154 (FIG. 4), which are 6 m intervals in the illustrated embodiment. Third rope 132 can be provided with any desired number of double ring markers 152, for example to indicate the final storage position of the last port-side sail unit 102 (i.e. the P9 sail unit in the illustrated example embodiment), and the final storage position of the first starboard-side sail unit to be pulled around the stern 122 of ship 101 (i.e. the S9 sail unit in the illustrated embodiment). In some embodiments, third rope 132 is not provided with any double ring markers. The exact stowage spacing interval 154 used is not critical, but it should be a distance that is sufficient to avoid having components of adjacent sail units 102 collide with one another when in the stored configuration.

The third rope 132 is removed from its spool 138 and is extended over the port side of the ship with its slack end looped over a horncleat provided at a suitable location, e.g. on the assembly containing capstan 134. Third rope 132 is then drawn down the port side 120 of ship 101 to its starting position, which in this example embodiment is with its third from last double ring marker 152 positioned adjacent the P9 sail unit 102. In this configuration, the final double ring marker 152 on third rope 132 is available for the S8 sail unit 102, and the second to last double ring marker 152 on rope 132 is available for the S9 sail unit 102 when the starboard sail units 102 are drawn round to their deck-cleared configuration.

Once third rope 132 is secured in its desired starting position, the slack in y third ellow rope 132 is taken up and third rope 132 is wound round capstan 134. The P9 sail unit 102 is lashed to the third rope 132 at the third from last double ring marker 152 using a webbing loop 142 as described previously for white rope 130. The P9 sail unit 102 is drawn along the rail system 112 until the next stowage spacing interval 154 (i.e. 6 m in this example embodiment) double ring marker 152 on third rope 132 is adjacent the P8 sail unit 102. The P8 sail unit 102 is then lashed to third rope 132 using a webbing loop 142, and both the P8 and P9 sail units 102 are drawn along rail system 112 until the next stowage spacing interval 154 (i.e. 6 m in this example embodiment) double ring marker 152 on third rope 132 is adjacent the P7 sail unit 102.

This process is repeated until all of the port-side sail units P9 through P2 have been gathered with the desired stowage spacing interval 154 (in this illustrated embodiment, 6 m) between them. The P1 port side sail unit 102 remains at the P1 position and braced, with the final double ring marker 152 (in this case indicating the 6 m stowage spacing interval 154) aligned with the horn cleat 148 of the P1 sail unit 102.

Figure 19:
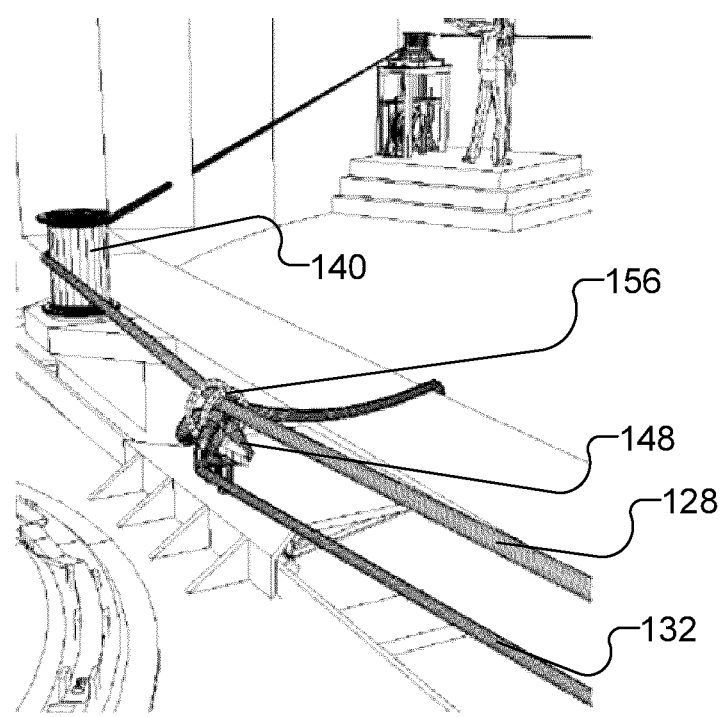
FIG. 19 shows an example embodiment of a rope guide and horn cleat provided on the sail units in some embodiments.

The free looped end 132A of third rope 132 is looped over a permanent horn cleat provided along the ship's handrail, and the opposite end of third rope 132 is released from capstan 134 and tied off the horn cleat 148 of the P1 sail unit 102, with slack spooled on the deck of the ship. The continuous rope formed from interconnected first rope 128 and second rope 130 is deployed about the perimeter of ship 101 as described previously, and the rope is passed through a rope guide 156 provided on the horn cleat 148 of the P1 sail unit 102, as shown in FIGS. 10 and 19.

Second rope 130 (forming part of the continuous drive rope 128, 130) is aligned so that its double ring markers 152 are positioned adjacent each starboard sail unit 102. The starboard sail units 102 are each lashed to second rope 130 using webbing loop 142 as described previously. Because the starboard sail units must pass around stern 122 of ship 101, the webbing loops 142 used to lash each starboard sail unit to second rope 130 should be sufficiently long to provide sufficient play to allow the sail units 102 to pass round the corners of stern 122.

Once the starboard sail units 102 are lashed to second rope 130, capstan 134 is used to pull the continuous drive rope 128, 130 to move the starboard sail units around the stern 122 of ship 101 with their sails in the movement configuration until the sail unit 102 from the S9 position is close to the sail unit 102 from the port side P9 position (e.g. within about 10 m in one example embodiment), as shown in FIG. 5.

The upper and lower booms 106, 104 on the S9 sail unit 102 are rotated through 90° so that they are in their storage configuration, i.e. so that they extend generally perpendicular to the side of ship 101, as shown for the port-side sail units 102 in FIG. 5. The starboard sail units are then drawn towards the bow 124 on the port side 120 until the S9 unit is adjacent a double ring marker 152 on third rope 132 at a stowage spacing interval 154 (e.g. 6 m in this example embodiment) from the P9 unit. The S9 sail unit 102 is then lashed to third rope 132 at the location of double ring marker 152. A short webbing loop 142 may be used to lash the S9 sail unit 102 to rope 132. The S9 sail unit 102 is then unlashed from second rope 130 and the process is repeated by turning the upper and lower booms 106, 104 on the S8 sail unit 102 by 90° to the storage configuration and advancing the S8 sail unit 102 forward to the next double ring marker 152 (spaced apart from the S9 sail unit by a stowage spacing interval 154, e.g. 6 m in this example embodiment) on third rope 132, lashing the S8 sail unit 102 to third rope 132 and unlashing the S8 sail unit 102 from the second rope 130, and so on for the remaining sail units 102 until a sufficient number are clear of the desired working area for dockside operations, e.g. the starboard side 118 and stern 122 as shown in the illustrated embodiment of FIG. 5.

To move the sail units 102 back to their deployed configuration for use, the reverse process is followed.

Figure 12:
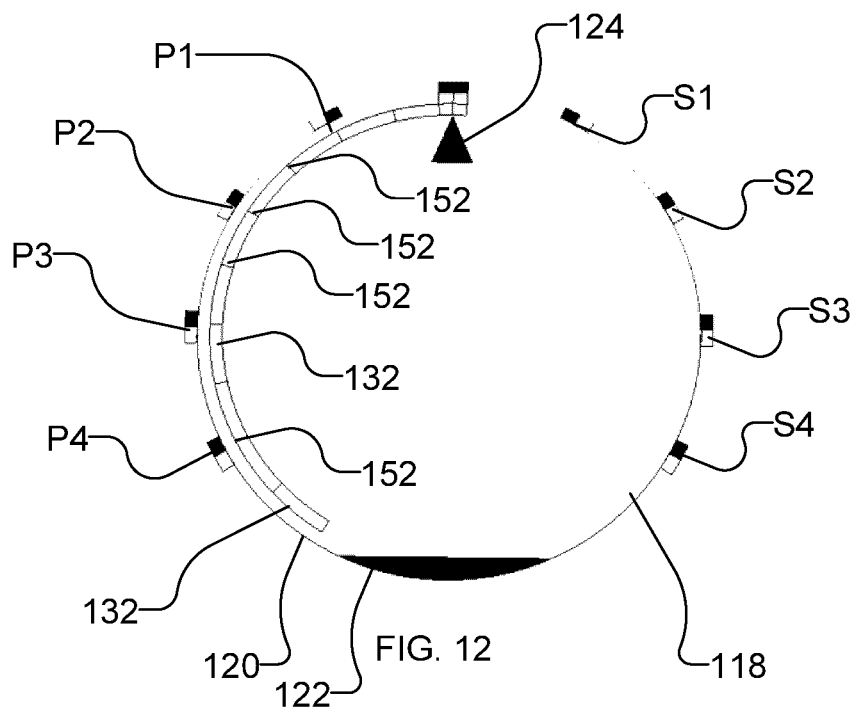
FIGS. 12, 13, 14, 15 and 16 show schematically steps in an example method of clearing sail units from one side of the ship to allow dockside operations to be carried out using a three-rope rope system.
Figure 13:
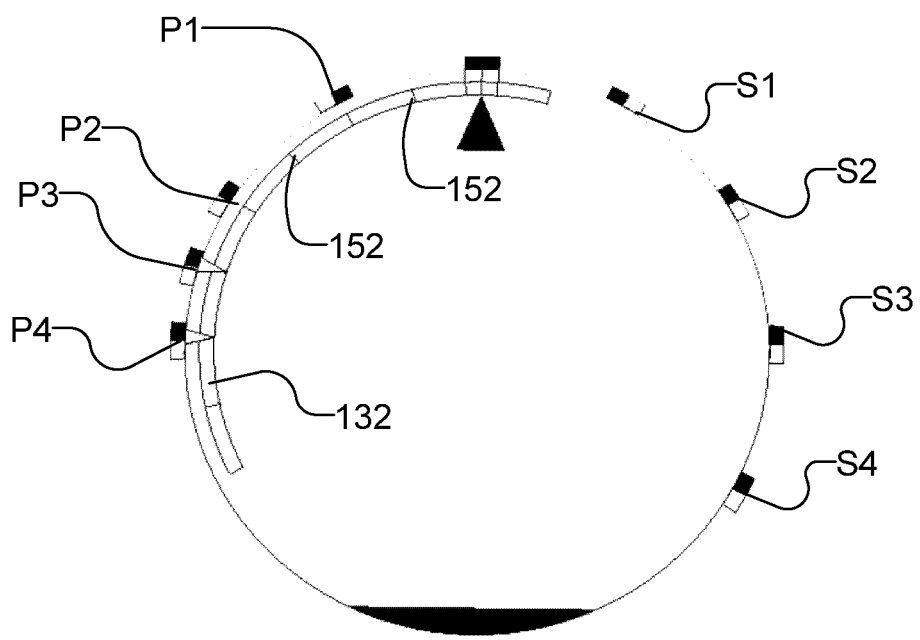

The process of using rope system 126 to move sail units 102 about ship 101 is illustrated schematically in FIGS. 12-16 with a hypothetical ship having four port-side sail units 102, labelled P1, P2, P3 and P4, and four starboard-side sail units 102 labelled S1, S2, S3 and S4 and using a rope system 126 having three separate ropes. As shown in FIG. 12, the third rope 132 is extended along the port side of ship 101, and the P4 sail unit is lashed thereto at one of the double ring markers 152 indicating the stowage spacing interval. The P4 sail unit is then drawn forward with its sail in the storage configuration until it is spaced apart from the P3 sail unit by the stowage spacing interval. The P3 sail unit is then lashed to third rope 132 at the double ring marker 152 adjacent that to which the P4 sail unit is secured, and the pair are drawn towards the bow 124 until the P3 sail unit is spaced apart from the P2 sail unit by the stowage spacing interval, as shown in FIG. 13.

This process is repeated until all of the port-side sail units have been drawn forward and secured in place on third rope 132, spaced apart by the stowage spacing interval, which can be but need not be the same distance between each pair of adjacent sail units 102. The sternmost end of third rope 132 is secured in any suitable manner, e.g. on a horncleat on the rail of ship 101, while the opposite (i.e. bow) end of rope 132 is then removed from capstan 134 and secured in place to secure the port-side sail units in place, while first and second ropes 128, 130 are deployed about the perimeter of the ship and lashed together to make a continuous rope as described above.

Figure 14:
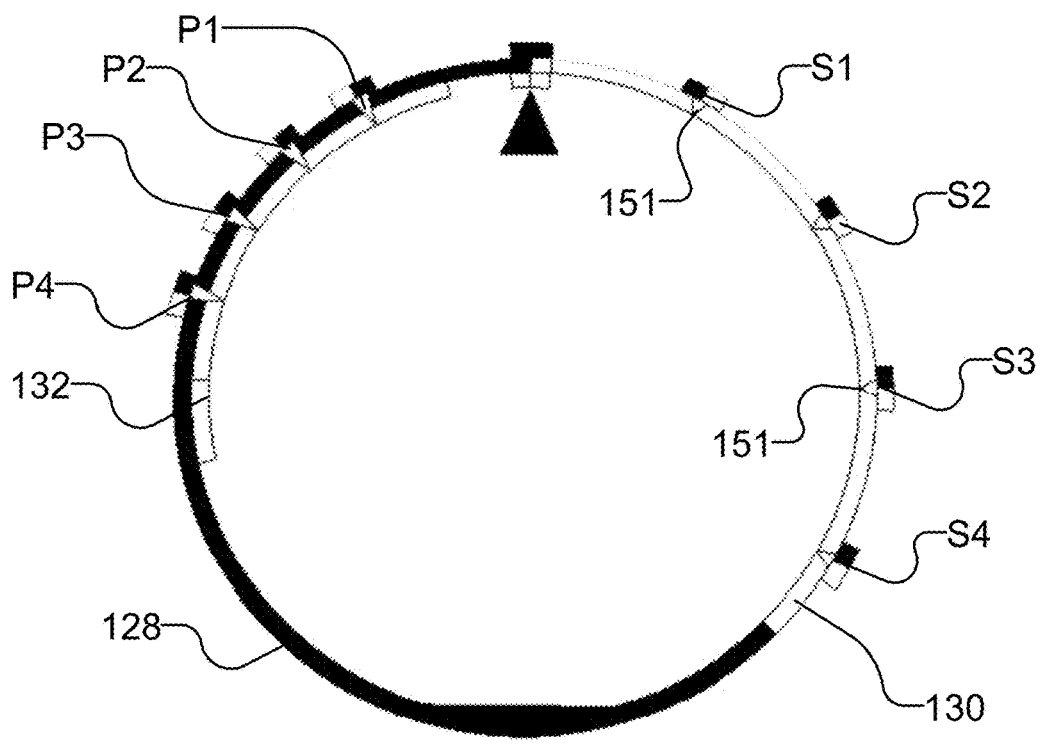
Figure 15:
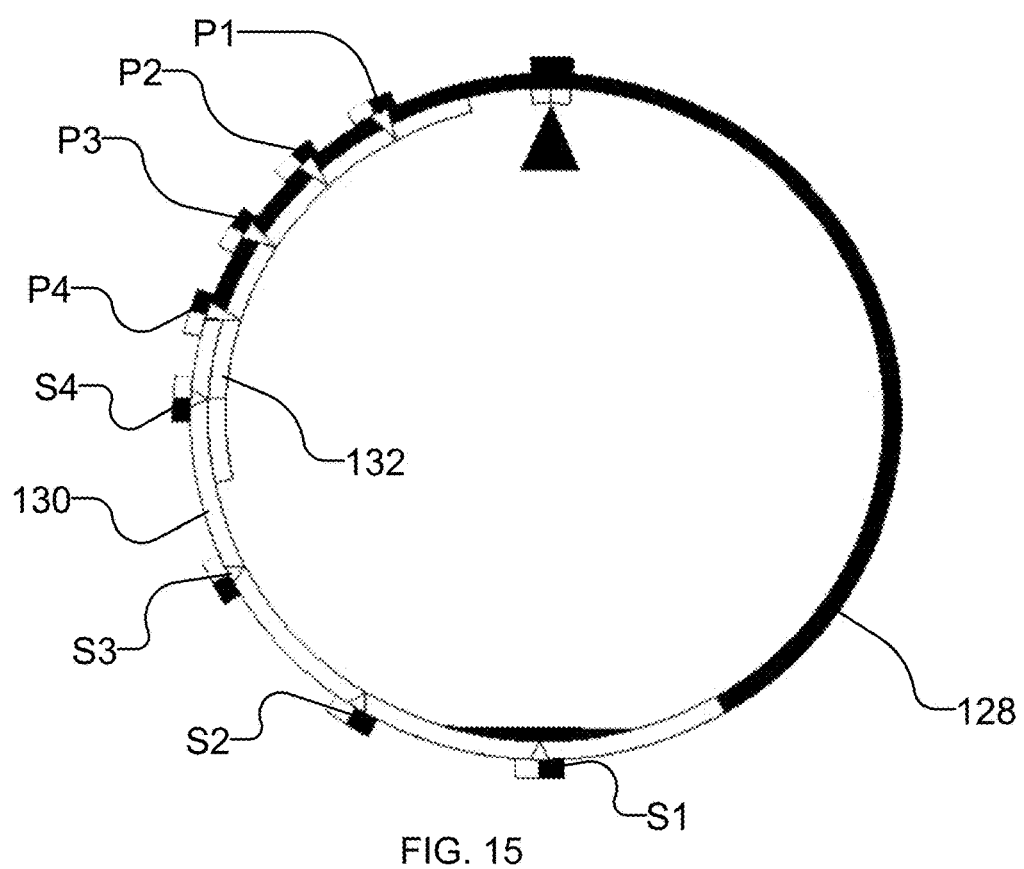

The starboard-side sail units in the S1, S2, S3 and S4 positions are all lashed to second rope 130 at the double ring markers 152 indicating the spacing distance, with the sails 108 in their movement configuration (i.e. oriented parallel to the sides of ship 101), as shown schematically in FIG. 14. Capstan 134 is actuated to move the starboard-side sail units along the edge of ship 101, around its stern 122. The S4 sail unit is turned to the storage configuration (i.e. with upper and lower booms 104, 106 extending perpendicularly to the side of ship 101), and moved to the stowage distance from the P4 sail unit, as shown in FIG. 15.

Figure 16:
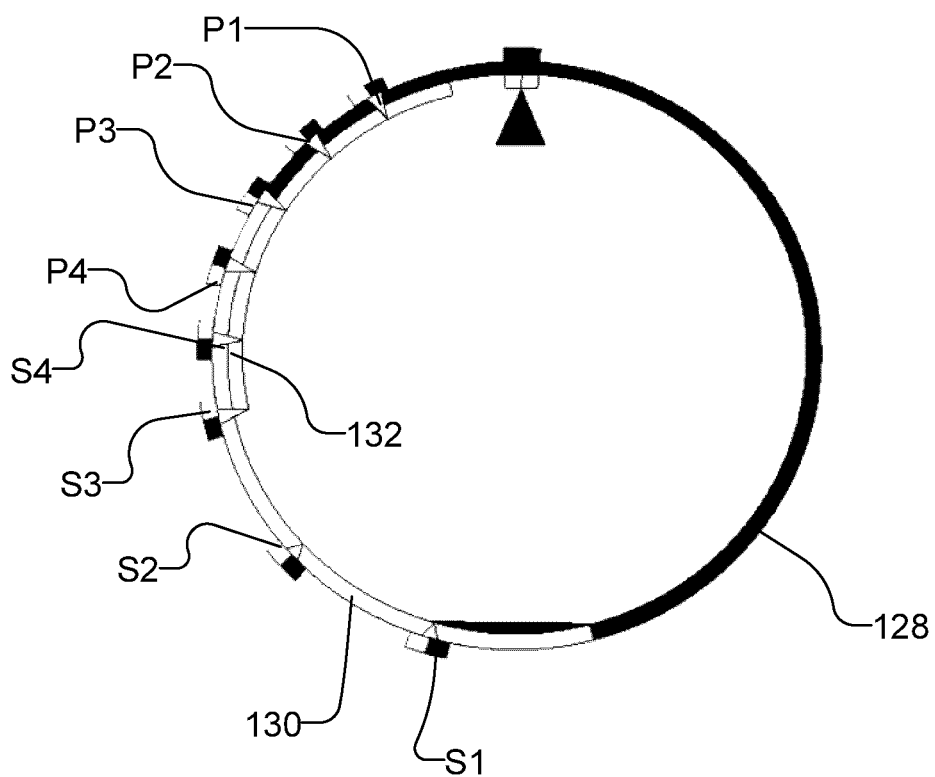

The S4 sail unit can then be lashed to third rope 132 if desired, and the S3 sail unit moved to a stowage distance from the S4 sail unit in a similar manner if desired, as shown in FIG. 16. This process is repeated until a sufficient number of the starboard-side sail units have been placed into the storage position so that the starboard side 118 and, if necessary, the stern 122 of ship 101 are clear for dockside operations to be carried out In alternative embodiments, an alternative rope system having only two ropes 128 and 130 can be used to move sail units 102 about the perimeter of ship 101. For example, as illustrated schematically in FIGS. 17-18 with a hypothetical ship having four port-side sail units 102 and four starboard-side sail units 102, a two-rope system comprising a first rope 128 and a second rope 130 lashed together as described above can be used to move sail units 102 about the perimeter of ship 101. Rather than using a third rope to which each sail unit 102 is lashed to secure the sail units 102 in place, each sail unit 102 can be moved to its storage position by actuating the combined drive rope 128, 130 using capstan 134, and then secured at its storage position by lashing the sail unit 102 to the ship's deck or railing, for example using an appropriately positioned cleat.

Figure 17:
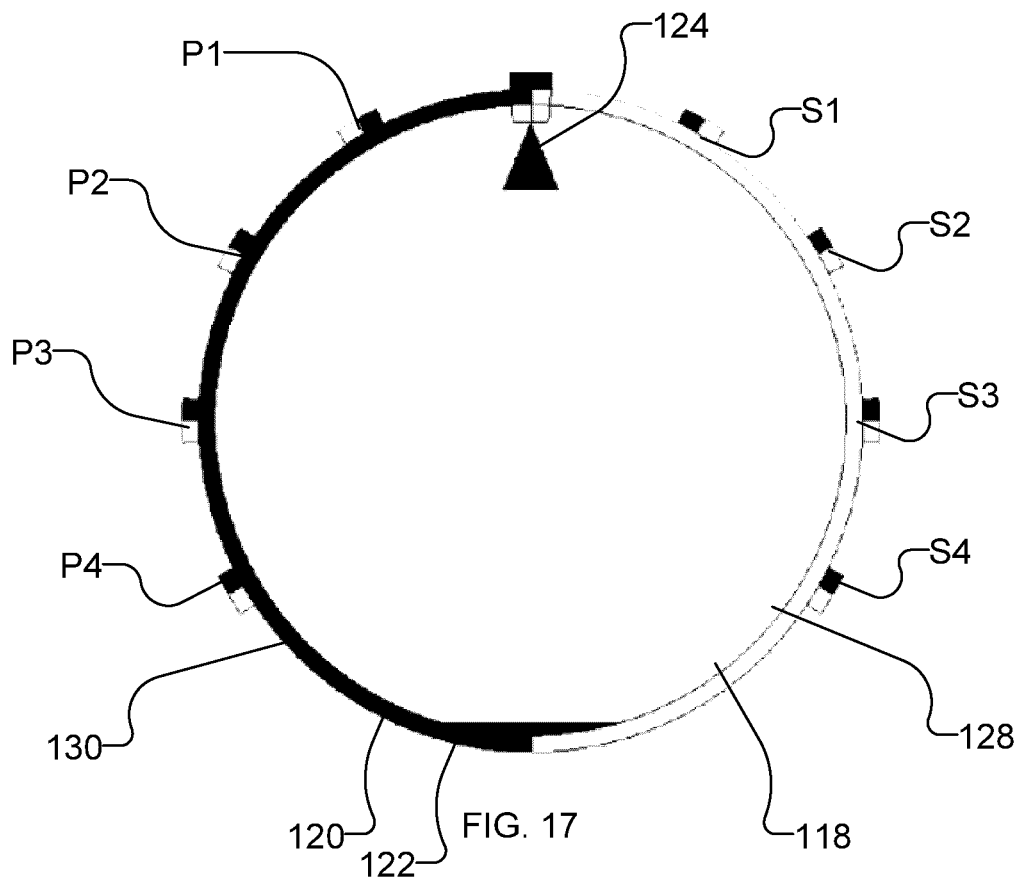
FIGS. 17 and 18 show schematically steps in an example method of clearing sail units from one side of the ship to allow dockside operations to be carried out using a two-rope rope system.

As shown in FIG. 17, each of the port-side sail units and starboard-side sail units is initially in its deployed configuration. The combined drive rope 128, 130 is run around the ship 101 as described above. The P1 sail unit is lashed to the ship's rail or other suitable securing structure and placed in the storage configuration (i.e. with upper and lower booms 106, 104 oriented perpendicular to the side of ship 101), while the P2 through P4 and S1 through S4 sail units are lashed to the combined black and white rope 128, 130 and their sails moved to the movement configuration (i.e. extending parallel to the side of the ship 101).

Figure 18:
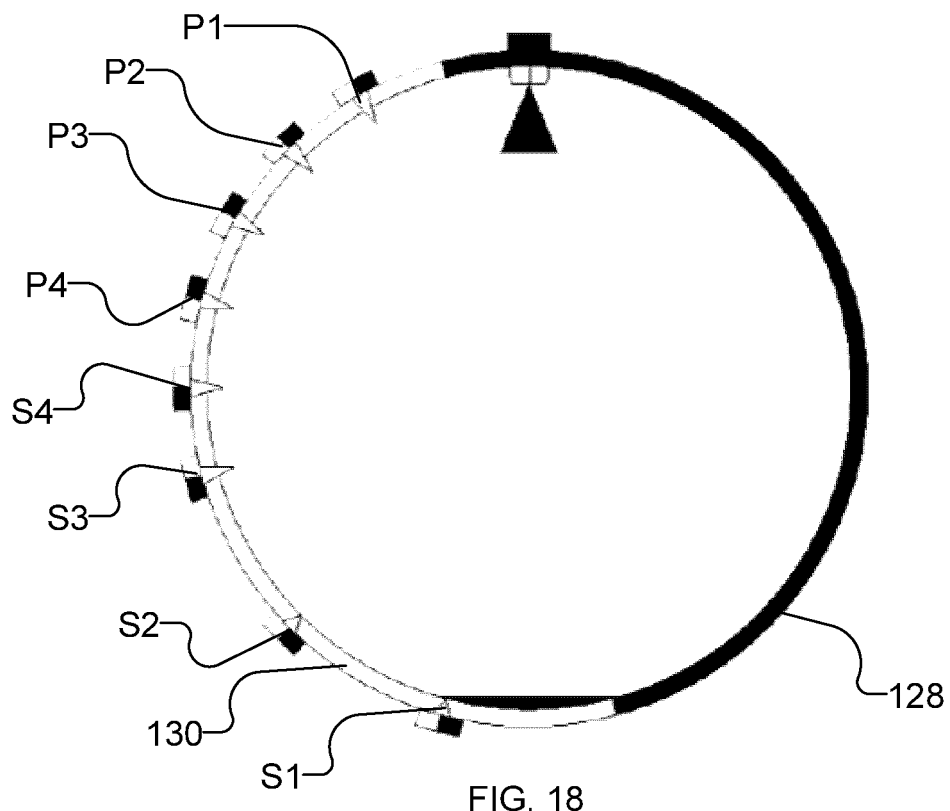

Capstan 134 is then actuated to move the sail units around the side of the ship 101, and each successive sail unit is moved to the storage configuration (i.e. with upper and lower booms 106, 104 extending perpendicular to the side of ship 101) and secured in position along the rail of ship 101 until the starboard side of ship 101 has been cleared of sail units, as shown in FIG. 18.

Any suitable rail system along which sail units 102 can be moved can be used in various embodiments. With reference to FIGS. 20-27, an example embodiment of a rail system 112 with mounting points 200 for fixing sail units 102 in place for use is illustrated.

Sail units 102 each provide a sail 108 and mast 110 mounted on a base unit 204. Base unit 204 includes all controls and motors required for its operation in some embodiments. Sail units 102 are mounted in an array on rail system 112 at suitable locations about ship 101. In some embodiments, base unit 204 has a housing 205 for containing mast 110 that is generally cylindrical.

In the illustrated embodiment, rail system 112 has a top rail 114 and a bottom rail 116. As shown in FIG. 21, bottom rail 116 is mounted on the side of the ship directly to the side of the hull, and has a groove 206 within which wheels 208 provided on an inside face of the housing of base unit 204 of each sail unit 102 are received and movable within groove 206.

As shown in FIG. 22, in the illustrated embodiment, top rail 114 has three different rails. The first is an external top rail 212, and the second is an inner profile rail 214, which is a rail that allows a single lifting action to lift base units 204 free of the fixing pegs and lugs used to secure base units 204 to mounting points 200 as described below by encouraging an upward and outward movement of base units 204 that both releases the lugs used to secure base units 204 in place and angles the base units 204 slightly to allow them to move smoothly along rail system 112. The external top rail 212 together with an inner profile rail 214 also acts as a channel 216 for a single roller ball 210 provided on base unit 204, as shown in FIG. 23, which together with suitable wheels provided at the bottom of base unit 204 for movement in groove 206 allows each base unit 204 to be rolled around the ship on rail system 112. Top rail 114 also has a face rail 218, which provides a flat surface to avoid interference with movement of sail units 102 about rail system 112. During movement of sail units 102, the units are angled slightly outwardly away from face rail 218, so that base unit 204 can slide smoothly past.

The base portion of top rail 114 is provided with a plurality of apertures 220 to allow water to run off of the ship's deck. The top and side faces formed by external top rail 212 and face rail 218 are generally flat surfaces save for the presence of occasional slots which receive the locating/fixing and locking pegs on each base unit 204 as described below. In some embodiments, the internal portion of top rail 114 includes an interior space 202, which can receive e.g. power and data cables used to operate rail-mounted auxiliary sail system 100.

Figure 24:
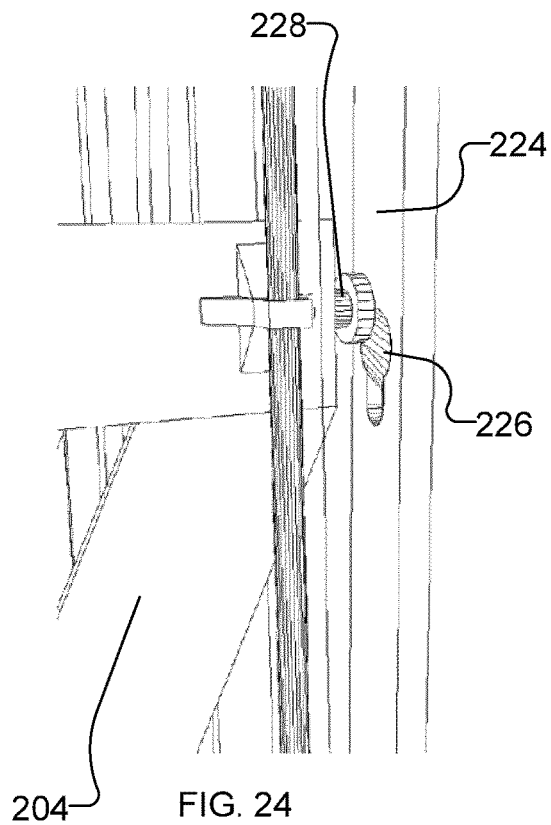
FIG. 24 shows an example embodiment of the engagement of lugs on a base unit of a sail unit with the fixed mounting points provided on the ship.
Figure 25:
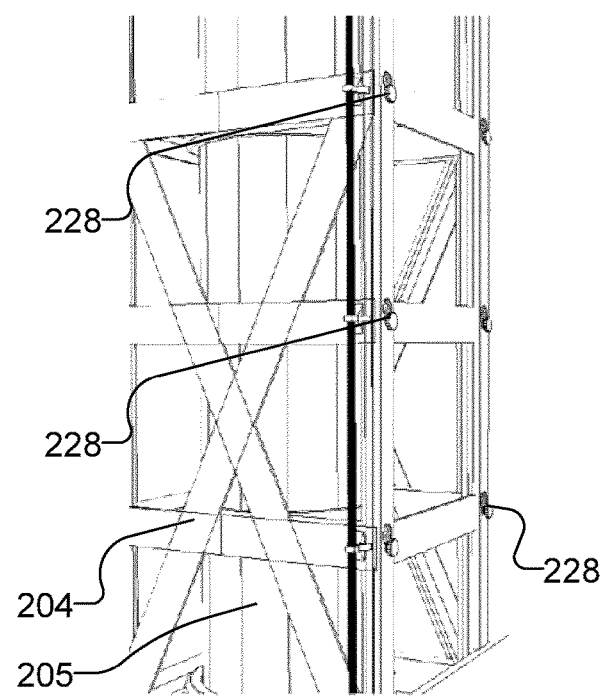
FIG. 25 shows an example configuration of the lugs on a base unit.

Mounting points 200 are provided at each point along the perimeter of ship 101 at which it is desired to deploy sail units 102. With reference to FIG. 20, an example embodiment of a mounting point 200 is illustrated. Mounting point 200 has two or more horizontal rails 222 that are run across and are secured to a plurality of the ship's ribs or framing members to lock mounting point 200 to the ship's hull. In the illustrated embodiment, at least two vertically extending rails 224 are mounted on horizontal rails 222, although alternative configurations could be used. Each vertically extending rail 224 is provided with a plurality of keyhole slots 226 formed therethrough, which receive and secure corresponding lugs 228 provided on the inside face of the housing of base unit 204 as shown in FIG. 24 to lock base unit 224 onto the ship's hull. The configuration of lugs 228 in the illustrated embodiment is also shown in FIG. 25, wherein a series of six lugs 228 is provided, with three lugs 228 being provided along vertically extending support struts of base unit 204. Alternative mounting configurations could be used in alternative embodiments.

Figure 26:
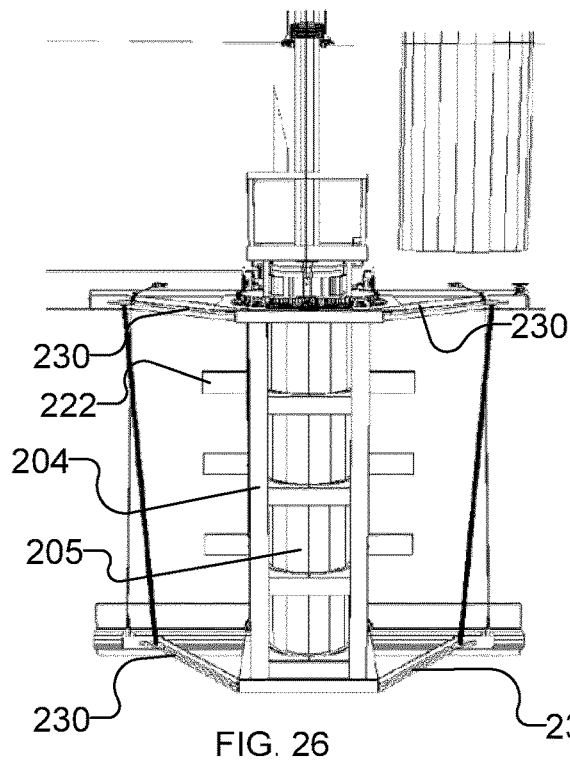
FIG. 26 is a side view of the base unit of a sail unit locked into place on the rail system.
Figure 27:
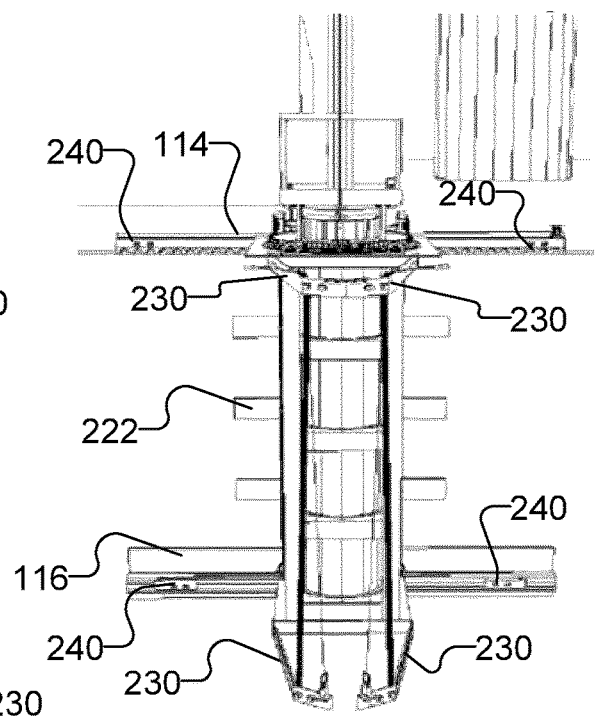
FIG. 27 is a side view of the base unit of a sail in position on the rail system, with the braces in a stored configuration.

As can be seen in FIGS. 26 and 27, one or more braces 230 is provided at the top and/or bottom of each base unit 204. Braces 230 are provided with fixed and locking pegs which can be engaged with corresponding slots formed in top rail 114 and bottom rail 116 to further secure base unit 204 in place and stabilise base unit 204 laterally when braces 230 are in their secured configuration.

As shown in FIG. 27, braces 230 are initially set in their stored configuration, i.e. retracted away from rail system 112, and can be released and engaged with top rail 114 and bottom rail 116 via corresponding slots 240 provided within top and bottom rails 116 at corresponding locations to receive and secure braces 230. In one example embodiment, top brace 230 is locked in place using a locking peg with a horncleat handle, while bottom rail can be locked in place by using a latch to engage bottom rail 116. If desired, the latch can be released, e.g. using a latch releasing cable, and then secured in place to give the final assembly without slamming the latch.

Figure 28:
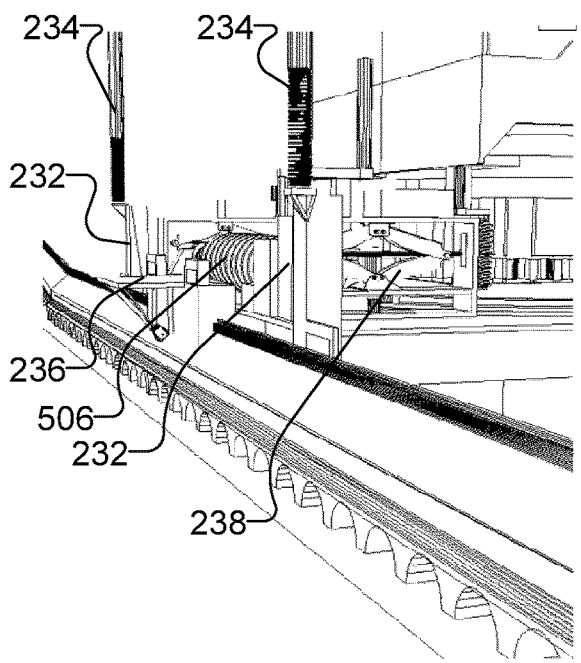
FIG. 28 shows an example embodiment of a step in loading the sail units onto the rail system.

Sail units 102 can be loaded onto rail system 112 in any suitable manner and at any suitable location. In one example embodiment, with reference to FIG. 28, sail units 102 are loaded at the S3 position, i.e. the position third from the bow 124 on starboard side 118. Two spacers 232, fore and aft, are secured on top rail 114. Spacers 232 have flexible flag markers 234, which may be different colours (e.g. blue for aft and for fore in this example embodiment), in order to visually assist a crane operator to mount sail units 102 on rail system 112.

Sail unit 102 is brought to spacers 232 and the top plate 236 on the base unit 204 engages guides on the spacers 232. The crane then lowers sail unit 102, pivoting it until top plate 236 is flush with the spacer recess and setting the unit at a slight angle to the vertical (1.3° in the illustrated embodiment, although the exact angle is not critical and will be a consequence of the positioning of top rail 114 and bottom rail 116 in any given embodiment). Roller ball 210 is brought into contact with top rail 114 to engage top rail 114 as described above.

The loading operator can then open the fore and aft scissor jacks 238 provided on sail unit 102 somewhat, e.g. halfway in the illustrated embodiment, to lower the bottom wheels 208 into grooves 206 in bottom rail 116.

With roller ball 210 on the channel 216 in top rail 114 and bottom wheels 208 in groove 206 on bottom rail 116, sail unit 102 is self-supporting and the crane is released. Scissor jacks 238 can be opened to full with the wheels 208 and roller ball 210 supporting the unit. The aft spacer 232 is removed. With the unit in the high position, sail unit 102 can be rolled along rail system 114 out of the way and/or to the required position about ship 101, e.g. using rope system 126 as described above. With sail unit 102 out of the way, aft spacer 232 can be put back into position and the next sail unit 102 loaded by crane.

Figure 29:
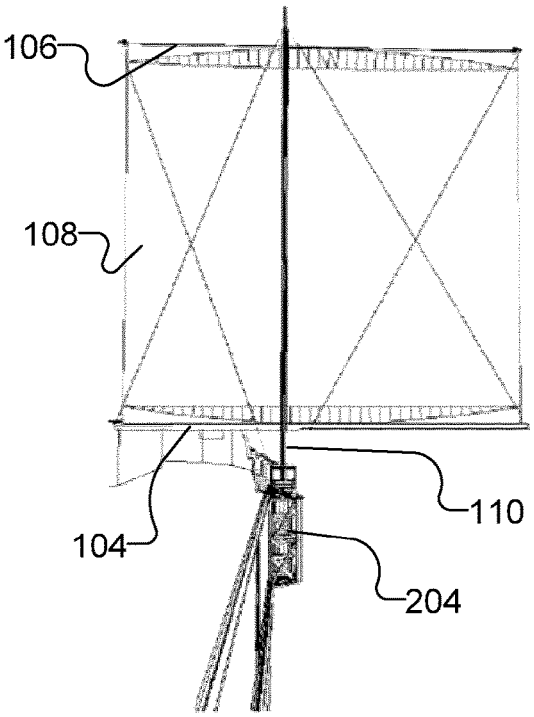
FIG. 29 shows an example embodiment of a square-rigged roller blind sail.

As shown in FIG. 29, sail units 102 in the illustrated embodiment are a roller blind design of sail, which are configured to reef from full up to full down in increments of ¹⁄₁₀ of a sail drop. Sails 108 are supported on a mast 110 that can rotate about its longitudinal axis and be fixed in position at any point along its path of rotation. In some embodiments, mast 110 can rotate and be fixed in position through 360° about its longitudinal axis.

In the illustrated embodiment, lower and upper booms 104, 106 (and therefore sails 108) are offset horizontally along mast 110, i.e. mast 110 is not at a horizontal centerpoint of lower and upper booms 106, but rather is at approximately a ⅖:⅗ offset, i.e. positioned at approximately ⅖ of the width of booms 104, 106 as measured from a first edge, with the shorter portion of lower and upper booms 104, 106 being oriented inwardly towards the centre of ship 101 when sail units 102 are in use.

Figure 30:
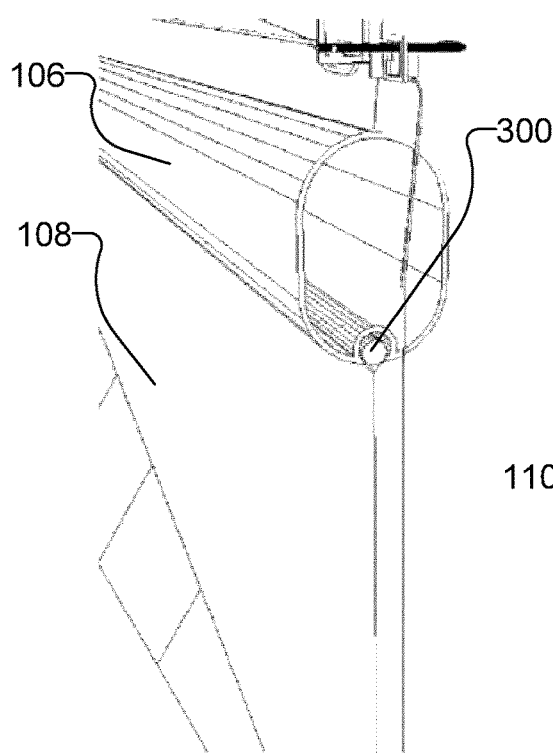
FIG. 30 shows an example embodiment of a rod used to secure the sail within the top boom.

In the illustrated embodiment, sails 108 are square-rigged roller blind sails, with the sails 108 trapped within the upper and lower booms 106, 104 by rods 300 and 315, as shown in FIGS. 30 and 34A, respectively. Rods 300 are fixed within upper boom 106 to hold the sail fixed within upper boom 106. Rods 315 likewise hold sail 108 in a fixed relation within lower boom 104.

Lower boom 104 is rotatable about its longitudinal axis, so that the cloth from which sail 108 is made can be wound around lower boom 104 as sail 108 is reefed or lowered. Correspondingly, as upper boom 106 is raised, lower boom 104 is rotated as sail 108 unfurls and is raised.

Figure 34B:
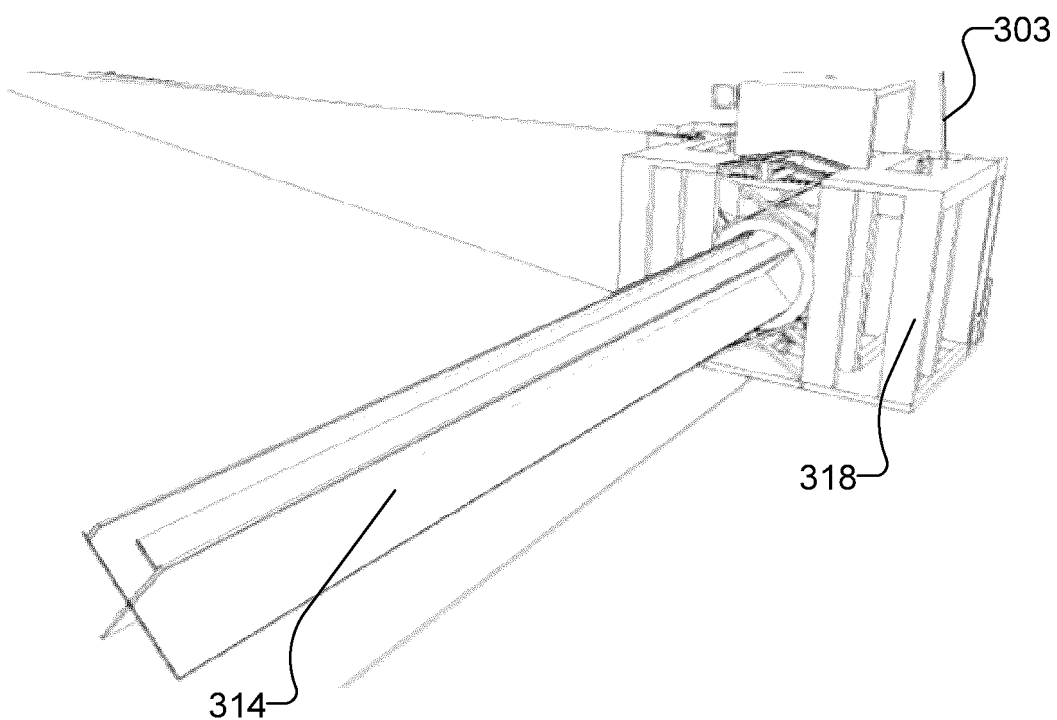
FIG. 34B shows an example of a bottom boom insert rotatable within bearings that allows the sail to be reefed around the lower boom.

In the illustrated embodiment, to facilitate rotation of lower boom 104, a bottom boom insert 314 is provided (FIG. 34B). Bottom boom insert 314 is mounted in fixed relation to lower boom 104 and sits therewithin, so that lower boom 104 and bottom boom insert 314 rotate as a unit. Bottom boom insert 314 is rotatably mounted on a plurality of support bearings in the bottom boom assembly (not shown) to allow lower boom 104 and bottom boom insert 314 to rotate. Bottom boom insert 314 is provided with a bobbin 318 at one end, which in the illustrated embodiment is integrally formed with bottom boom insert 314.

Figure 31:
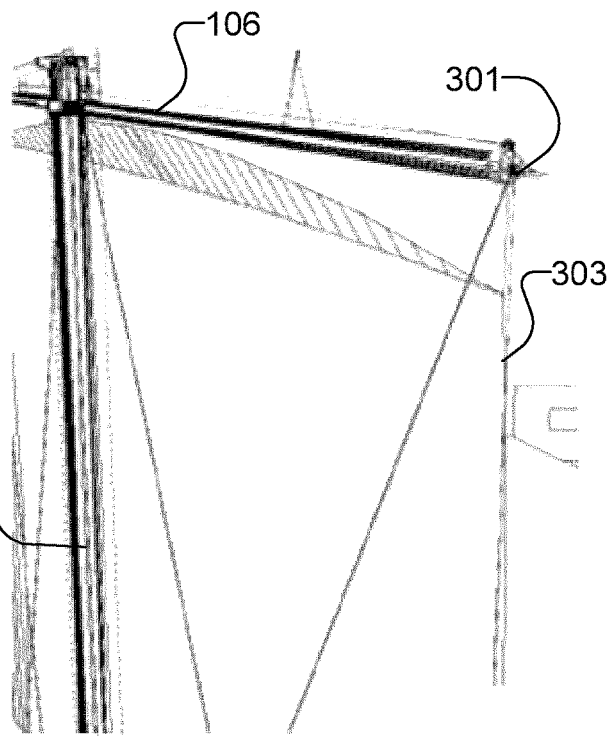
FIG. 31 shows an example embodiment of the pulleys and cables used to rotate the rods used to secure the sails within the booms.

To wind sail 108 about lower boom 104 as sail 108 is lowered and unwind sail 108 as sail 108 is raised, rods 300 and bottom boom insert 314 are coupled together via a set of pulleys 301 and reefing cables 303 as shown schematically in FIG. 31 and in FIG. 34A. Reefing cables 303 extend from bobbins 318 up to the upper portion of mast 110, and are coupled at their free end to top boom collar 310. When upper boom 106 is at its fully lowered position, reefing cables 303 are fully extended from bobbin 318, up to the upper portion of mast 110, and down to upper boom 106, so that bobbin 318 has little or no portion of reefing cable 303 wound therearound.

As upper boom 106 is actuated upwardly by top boom collar 310 being raised, force is exerted on sail 108, causing lower boom 104 to rotate to allow sail 108 to be released and hoisted. Correspondingly, slack is introduced into reefing cable 303 by the upward movement of top boom collar 310, which is wound around bobbin 318 as bobbin 318 rotates. In the illustrated embodiment, bobbin 318 has a tapered surface 320, i.e. a taper from a radially inward point to a radially outward point.

When upper boom 106 is lowered, top boom collar 310 is lowered, e.g. by releasing hoisting cable 428 as described below. The lowering of top boom collar 310 pulls on reefing cable 303 at the point where reefing cable 303 reaches bobbin 318, thereby rotating bottom boom insert 314 and thus lower boom 404 as reefing cable 303 becomes unwound. Sail 108 is held fixed in position on lower boom 104 to rod 315, so that the unwinding of reefing cable 303 thus winds sail 108 back around lower boom 104. As the amount of sail 108 that is wound around lower boom 104 increases, the combined thickness of lower boom 104 and sail 108 will increase. In some embodiments, providing tapered surface 320 ensures that the apparent thickness of reefing cable 303 wound around bobbin 318 remains similar to the combined thickness of lower boom 104 and sail 108 throughout the raising and lower process, so that lower boom 104 and bottom boom insert 314 can rotate uniformly and smoothly together.

Each mast is capped by a mast head 302 with various fixing points and pulleys. The mast head 302 secures the various support cables that secure the mast against the rest of the structure of sail unit 102, and that secure and actuate lower and upper booms 104, 106, and sail 108. The mast head 302 also allows the control cables to extend towards the deck of the ship.

In the illustrated embodiment, mast head 302 holds the mast strengthener arm 304 and the forward spur arm 306 integrally formed as a single-shaped beam, as shown in FIGS. 32 and 33. Upper boom 106 is held in position on mast 110 in any suitable manner, e.g. in part via top boom support cables and in part by a top boom collar 310 that is both engaged with mast 110 to allow vertical motion relative thereto and secured to upper boom 106. In some embodiments, top boom collar 310 is counterweighted to balance the horizontal offset of upper boom 106 relative to mast 110, to facilitate ease of movement when hoisting or lowering sail 108. Upper boom 106 can be actuated up and down mast 110 in any suitable manner, e.g. through the action of appropriate cables and pulleys, to hoist or lower sail 108 as described in greater detail below.

Lower boom 104 is likewise held in position on mast 110 in any suitable manner, e.g. via bottom boom support cables 312. Lower boom 104 is secured against movement in the lateral direction in any suitable manner via aft and forward bottom boom support cables, such as aft boom support cables 312. Two sets of bottom boom support cables, forward and aft, are used in the illustrated embodiment to hold lower boom 104 in position so it does not flip over. In some embodiments, a bottom boom spur is provided that extends perpendicularly to lower boom 104 to extend bottom boom support cables forwards and away from sail 108 to prevent sail 108 from contacting or rubbing against the bottom boom support cables.

Operational parameters such as the reefing and the angle of mast 110 can be controlled in any suitable manner. In some embodiments, the reefing and the angle of mast 110 are controlled using cables, cogs and worm screws. The cables, cogs and worm screws can be controlled centrally electronically (e.g. centrally from the bridge of ship 101), by an operator at a control unit of mast 110 electronically, and/or by an operator at a control unit of mast 110 in a manual fashion.

In one embodiment, automatic mechanical safety devices for conducting automated reefing of sail 108 are provided. In one embodiment, automatic mechanical safety devices for conducting automated mast release of mast 110 are provided. In some embodiments, these automatic mechanical safety devices can prevent or limit damage to ship 101, mast 110 or sail 108 through excessive wind and/or sudden gusts of wind.

Figure 35:
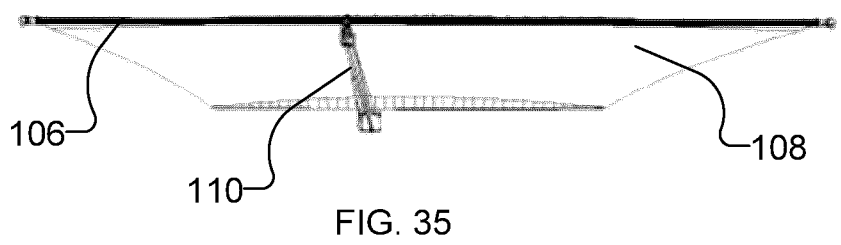
FIGS. 35, 36 and 37 show how the top boom flexes to activate a top boom flex detecting cable in one example embodiment.
Figure 36:
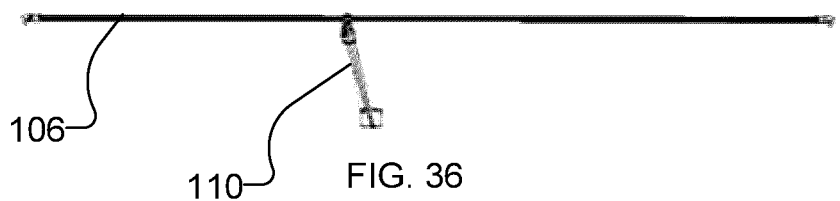
Figure 37:
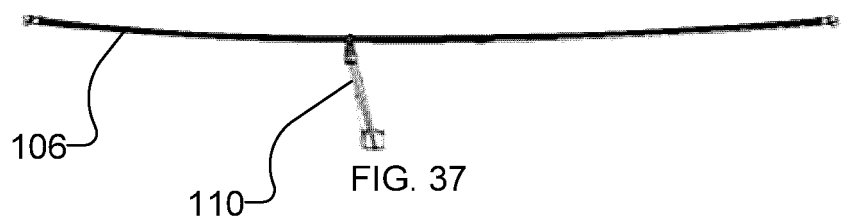

In one embodiment, the automatic mechanical safety device provides an auto-reefing function for sails 108 and is referred to generally as automatic reefing sail safety feature or system 400. The auto-reefing function is activated by a top boom flex detecting cable 402, shown schematically in FIG. 38. As shown in FIG. 35 and schematically in FIG. 36, during normal operating conditions, top boom 106 extends generally horizontally. However, during an extreme wind event, i.e. a wind event that is at the utmost, greatest or maximum level that sails 108 can endure, top boom 106 flexes due to the increased forces, as shown schematically in an exaggerated fashion in FIG. 37.

Figure 38:
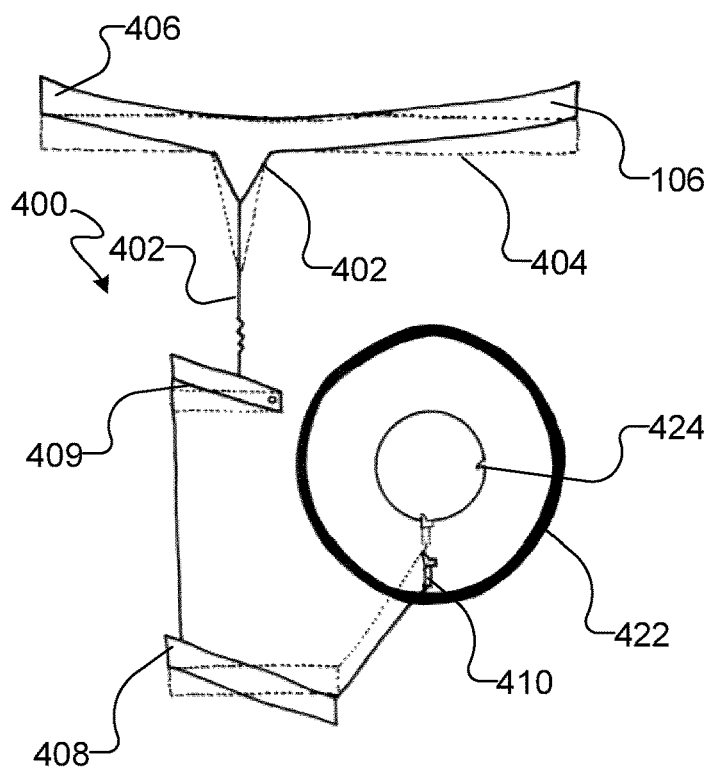
FIG. 38 shows an example embodiment of a top boom flex detecting cable.

The position of top boom flex detecting cable 402 is illustrated schematically in FIG. 38 in two positions: a first position 404 reflective of normal wind conditions, shown in dashed lines, and a second position 406 shown in solid lines, in which extreme wind conditions have caused upper boom 106 to flex forward against the mast, which in turn exerts a force on each end of the flex detecting cable 402 and therefore an upward force at the point where the two sides meet and on the portion of flex detecting cable 402 that descends to the control panel to actuate variable lever 408 as described below.

Top boom flex detecting cable 402 acts via appropriately positioned pulleys, cogs and lever on a variable lever 408 (FIG. 39) to release a retaining member, which in the illustrated embodiment is provided by drum latch 410, which releases upper boom 106 to reef sail 108 down by one rotation of a top boom cable drum 422 around which the top boom hoisting cable 428 is run. In some embodiments, top boom cable drum 422 has a circumference that is approximately equal to $\frac{1}{10}^{th}$ the height of sail 108, to yield in some embodiments a $\frac{1}{10}^{th}$ drop of sail 108, i.e. a 10% reduction in the surface area of sail 108 exposed to wind, when top boom flex detecting cable 402 is activated.

Figure 39:
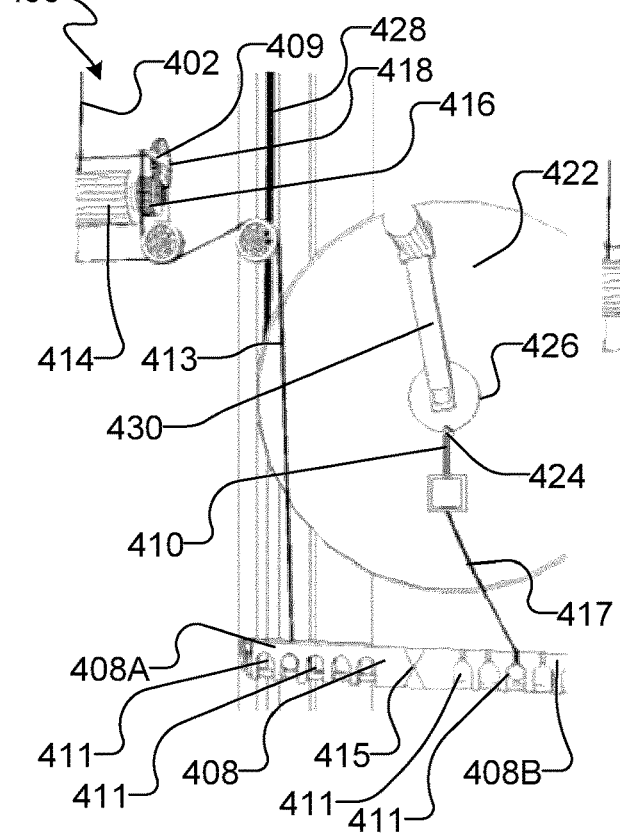
FIG. 39 shows the mechanism that is used to incrementally reef the sails when the top boom flex detecting cable is activated.
Figure 40:
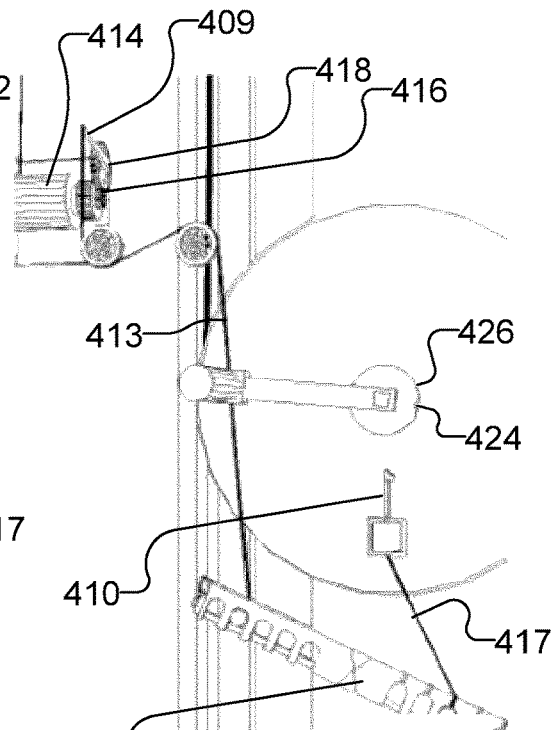
FIG. 40 shows the mechanism that is used to incrementally reef the sails in the activated configuration.

With reference to FIGS. 39 and 40, to activate automatic reefing sail safety feature 400, top boom flex detecting cable 402 is run to an inertia drum 414 provided within a control panel of each sail unit 102 (the housing within which inertia drum 414 is supported is omitted from FIG. 39 for clarity). Top boom flex detecting cable 402 is connected at one end to rotate inertia drum 414. Inertia drum 414 has a rotating actuator cog 416, the teeth of which are engaged with corresponding teeth provided on a rotating lever cog 418 that is coupled to rotate variable lever 408 via an actuating lever 409.

Under normal operating conditions experienced when raising or lowering sail 108, inertia drum 414 acts as a damping member and is able to absorb typical forces applied by top boom flex detecting cable 402, i.e. inertia drum 414 does not rotate particularly rapidly, and the turning of the teeth of rotating actuator cog 416 correspondingly turns only a few teeth on rotating lever cog 418. Actuating lever 409 and variable lever 408 are thus rotated only by small amounts that are insufficient to release drum latch 410, which is ordinarily biased inwardly against an outer circumference of top boom cable drum 422 as described below.

Figure 41:
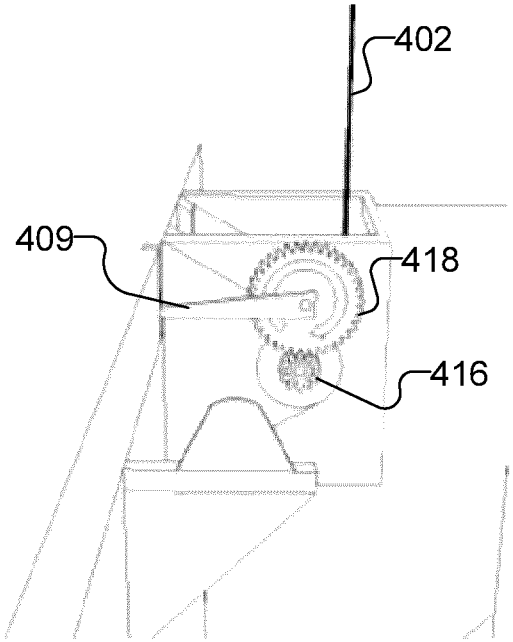
FIGS. 41 and 42 show the position of the actuating lever of the automatic reefing sail safety feature in one example embodiment, in the unactivated and activated configurations, respectively.
Figure 42:
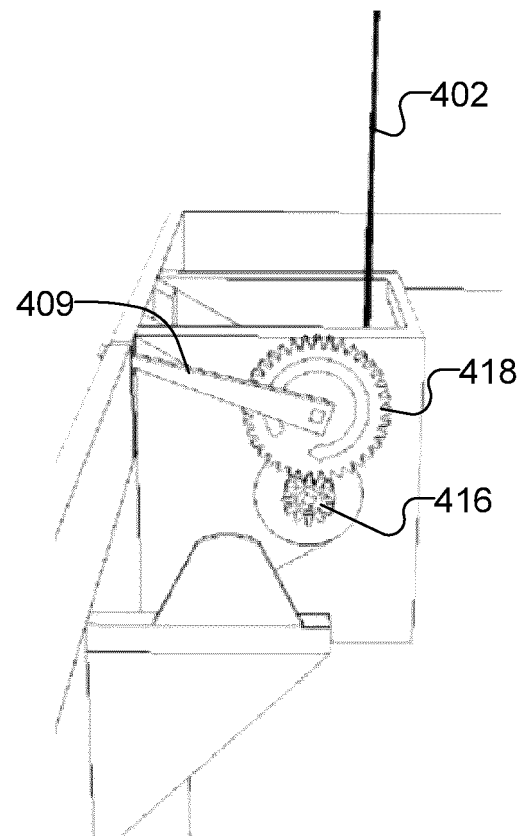

However, upon the occurrence of an extreme wind event, e.g. a strong gust of wind or a sustained wind above a certain speed that is at the utmost, greatest or maximum level that sails 108 and mast 110 can endure, inertia drum 414 is not able to absorb the rotating forces applied by flex detecting cable 402, with the result that rotating actuator cog 416 rotates rotating lever cog 418 to a sufficient extent to lift actuating lever 409 to a sufficient extent to allow variable lever 408 to actuate drum latch 410, e.g. as shown in FIG. 42 in the actuated position versus FIG. 41 showing the unactuated position. Actuation of drum latch 410 releases top boom cable drum 422 for rotation.

In the illustrated embodiment, an actuating cable 413 is movable by the lifting of actuating lever 409 to the actuated position, and actuating cable 413 is positioned to exert an upward force on first end 408A of variable lever 408. This causes variable lever 408 to pivot about a pivot point 415, so that second end 408B of variable lever 408 is displaced downwardly, to exert a downward force on drum latch 410 via a second actuating cable 417.

Actuation of drum latch 410 releases the top boom cable drum 422 for rotation because drum latch 410 is ordinarily inwardly biased to remain engaged with a securing recess 424 provided along the outer circumference 426 of a portion of top boom cable drum 422. Drum latch 410 can be inwardly biased to remain engaged with securing recess 424 in any suitable manner, for example via a spring biasing drum latch 410 inwardly in a manner similar to a door latch.

When actuated by variable lever 408, drum latch 410 is pulled outwardly out of securing recess 424 (best seen in FIG. 40). This allows the outer circumference 426 of top boom cable drum 422 to slide past drum latch 420, thereby allowing top boom cable drum 422 to be rotated under the force applied by the dropping upper boom 106 via hoisting cable 428, which extends from top boom cable drum 422 to top boom collar 310 to raise and lower top boom 106. The unactuated and actuated positions of actuating lever 409 are illustrated in FIGS. 41 and 42, respectively.

In some embodiments, hoisting cable 428 is run as a closed loop running around the top boom cable drum 422 and up to the top of upper boom 106 at one end, and up to the bottom of upper boom 106 at the opposite end.

Once the pressure applied by top boom flex detecting cable 402 has subsided, inertia drum 414 again is able to damp small forces and variable lever 408 does not actuate drum latch 410. Drum latch 410 thus returns to its inwardly biased securing configuration, and is biased radially inwardly along the outer circumference 426 of top boom cable drum 422. Thus, once top boom cable drum 422 completes one rotation, drum latch 410 becomes aligned again with securing recess 424 and extends inwardly inside securing recess 424, to again secure top boom cable drum 422 in place and prevent top boom 106 from dropping further, unless a significant wind event again actuates variable lever 408.

As noted, rotation of top boom cable drum 422 as described above releases hoisting cable 428 to allow top boom 106 to move downwardly. In some embodiments, the circumference of top boom cable drum 422 about which hoisting cable 428 is wound corresponds to approximately $1/10^{th}$ the vertical height of mast 110. Thus, activation of variable lever 408 and corresponding rotation of top boom cable drum 422 by one rotation will result in a $1/10^{th}$ drop in height of top boom 106, or approximately a 10% decrease in the surface area of sail 108 exposed to the wind.

In some embodiments, the process of reefing sail 108 using automatic sail safety reefing feature 400 may be repeated one, two, three or more times until an appropriate degree of reefing of sail 108 has been reached.

As best seen in FIG. 39, variable lever 408 is adjustable by providing a plurality of different connection points 411 for the cables 413, 417 that actuate drum latch 410. By adjusting the distance between the connection point 411 to which the cables 413, 417 that actuate drum latch 410 are fixed and the central pivot point 415 of variable lever 408, the amount of force that must be applied to cause actuating lever 409 to release drum latch 410 can be varied as desired.

As also seen in FIG. 39, a manual release lever 430 is provided that can be used to rotate drum latch 410 out of engagement with securing recess 424, to allow for manual actuation of the automatic sail safety reefing feature 400 if desired, and/or to allow drum latch 410 to be released from securing recess 424 when it is desired to raise sail 108 by rotating top boom cable drum 422 to hoist sail 108 using hoisting cable 428, for example by using a motor or hand crank. In some embodiments, each sail unit 102 is provided with one or more hand cranks mounted to operate the otherwise motor driven components of sail unit 102, for e.g. manual reefing, control of mast angle, and raising and lowering of mast cog 504 in the event of a loss of electrical power.

In alternative embodiments, rather than using a hoisting cable 428 wound round top boom cable drum 422, a continuous chain can instead be run up and down mast 110, connected to raise and lower upper boom 106, and wound round a chain-grabbing drum (i.e. a drum with fingers or projections that can be inserted into the links of the chain to wind the chain upwardly to raise upper boom 106 or downwardly to allow upper boom 106 to be lowered) and the chain-grabbing drum could take the place of top boom cable drum 422 in the described embodiment. Such an embodiment might provide more reliable operation over a long period of time, as a chain may be less prone to stretching than a cable. In such embodiment, the chain-grabbing drum could be rotated in the same manner as described above for rotating top boom cable drum 422 to allow upper boom 106 to be raised and lowered, including by the operation of automatic reefing safety sail feature 400.

Figure 43:
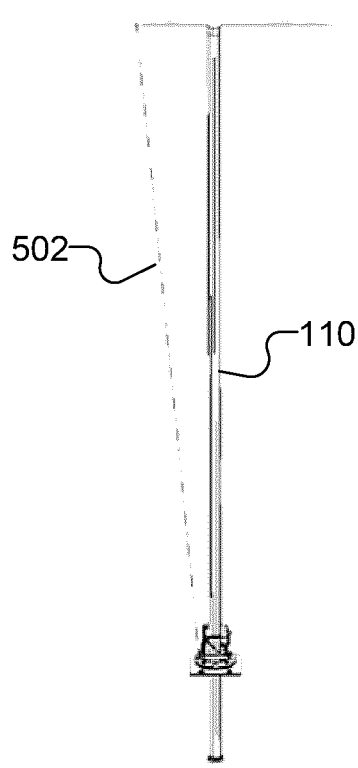
FIGS. 43 and 44 show schematically how the automatic mast rotation release feature is activated in some example embodiments by movement of the mast from its normal operating position (FIG. 43) to a deflected position caused by an extreme wind event (FIG. 44).
Figure 44:
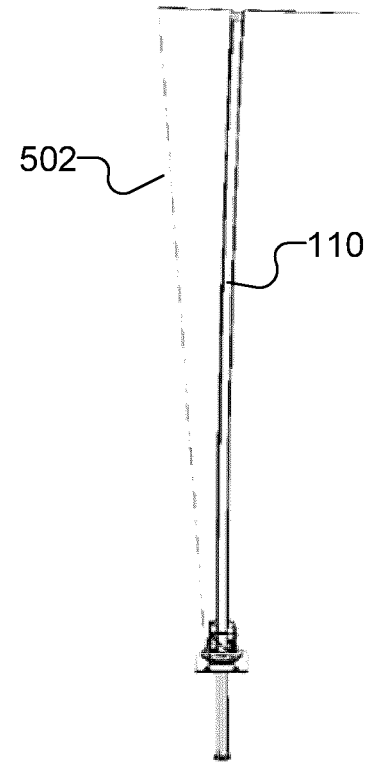
Figure 48:
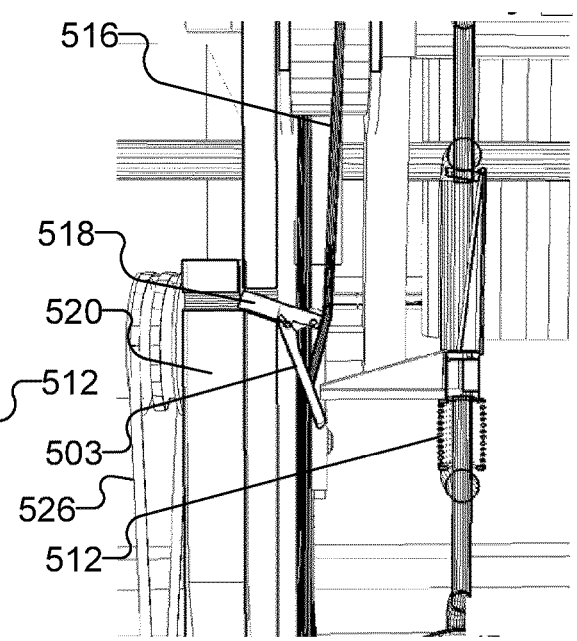
Figure 49:
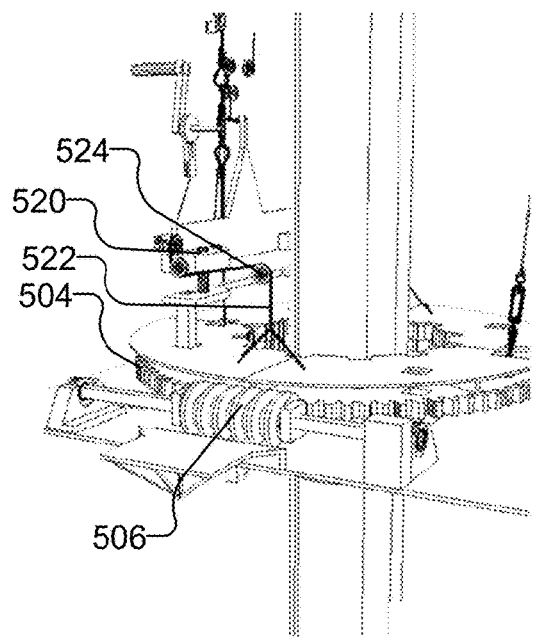
FIGS. 49 and 50 show the mast cog being lifted off the worm screw to allow the mast to rotate during an extreme wind event.
Figure 51:
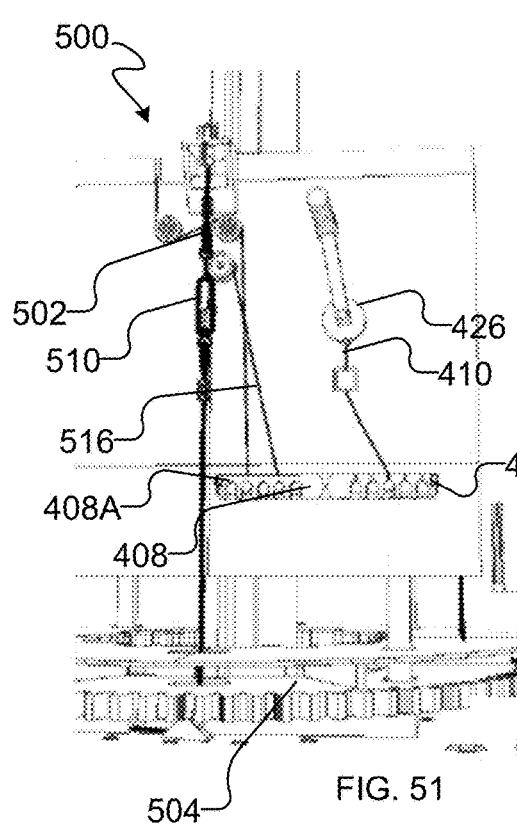
FIGS. 51 and 52 show the corresponding activation of a full automatic sail reefing feature provided in some embodiments.

In one embodiment, the automatic mechanical safety device provides an automatic rotational release of mast 110 that allows sail 108 to rotate to be aligned with the wind, to very rapidly release the wind pressure on sail 108, referred to generally as automatic mast rotation release system 500. In this embodiment, a mast strengthener cable 502 is coupled to mast 110 (e.g. as shown in FIGS. 43 and 44). If mast 110 experiences too much force and deflection from wind pressure as shown in FIG. 44, mast strengthener cable 502 acts as a sensing cable and actuates a mechanical switch 503 (FIGS. 45-48) to release a mast release weight 520 to lift a mast cog 504 off a worm screw 506, which controls the angular setting of the mast 110 under ordinary operating conditions (FIGS. 49 and 51). This allows the ⅔ths:⅗ths offset sail to rotate in line with the wind as shown in FIG. 54 versus the normal operating configuration shown in FIG. 53, to immediately release the wind pressure on sail 108 and thus mast 110.

Figure 45:
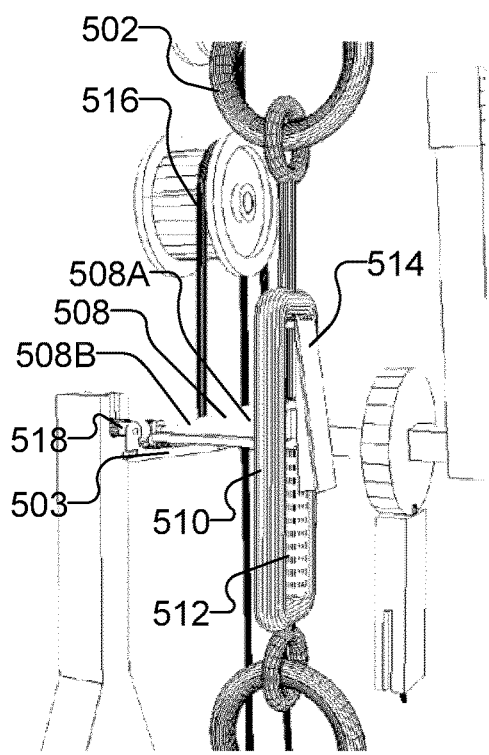
FIGS. 45 and 46 show an example embodiment of a mechanical switch that is actuated to activate the automatic mast rotation release safety feature in some embodiments, in the unactuated and actuated configurations, respectively.
Figure 46:
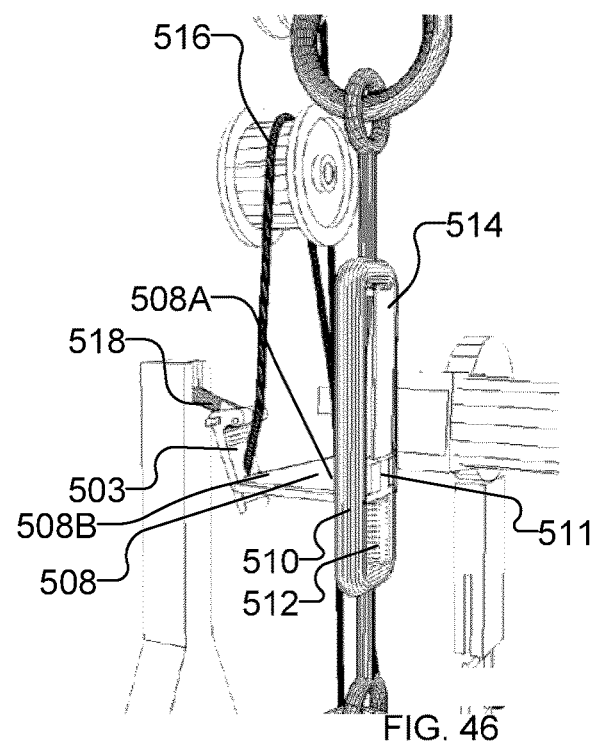
Figure 47:
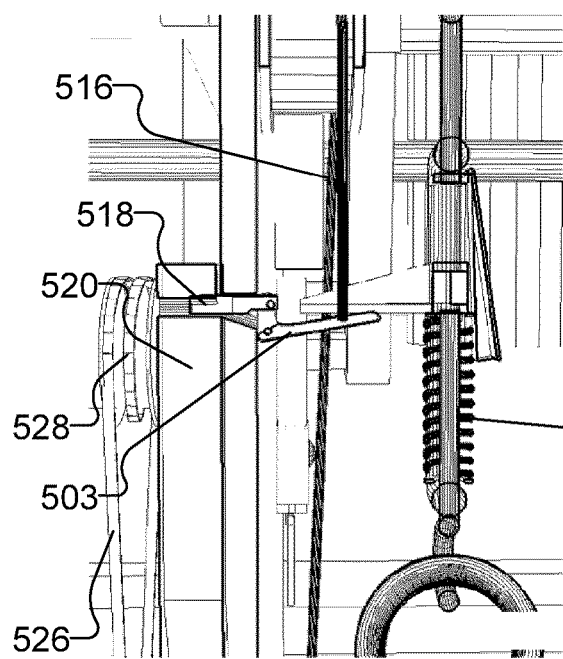
FIGS. 47 and 48 show alternate views of the mechanical switch that is used to release a mast weight to allow the mast to freely rotate in some embodiments.

In the illustrated embodiment, chain tensioners and a spring are used to actuate a mechanical switch to automatically release mast 110 after a predetermined amount of force has been exerted on mast 110. As shown in FIGS. 45 and 47, ordinarily mechanical switch 503 is held in a raised position by the weight of the mast release weight 520 acting on a pin 518 which is connected to be moved by switch 503 when switch 503 is actuated. A projecting tab 508 that actuates switch 503 is connected to the mast strengthening cable 502 by an eye bar 511 (FIG. 46) that runs up through a retainer 510 of the chain tensioner. The projecting tab 508 is normally biased to be held in place on top of switch 503 by a spring 512 fixed inside the retainer 510, so that projecting tab 508 constitutes an example embodiment of a spring-supported latch.

In more detail, projecting tab 508 sits with a first end 508A fixed within retainer 510 and that is biased at its first end by spring 512 contained within retainer 510 via eye bar 511. Retainer 510 acts like a chain tensioner, and is engaged with mast strengthener cable 502 and a fixed point on ship 101 so that forces exerted by mast strengthener cable 502 during normal sailing operations are ordinarily absorbed by spring 512.

Upon the occurrence of an extreme wind event that causes mast 110 to flex beyond an acceptable predetermined limit and thereby exert a predetermined amount of force on mast strengthener cable 502, the force exerted by mast strengthener cable 502 on retainer 510 compresses spring 512 to a sufficient extent that a sprung locking tab 514 pivotably mounted within retainer 510 fully enters retainer 510. Locking tab 514 enters retainer 510 and engages with the first end 508A of projecting tab 508 as shown in FIGS. 46 and 48. Locking tab 514 thus becomes locked in place. As this occurs, the second end 508B of projecting tab 508 moves downwardly so that mechanical switch 503 is forced downwardly and actuated. Actuation of switch 503 pulls pin 518 out far enough for the mast releasing weight 520 to drop (FIGS. 46 and 48).

The spring 512 is selected based on the application of Hooke's law so that once the predetermined amount of force has been exceeded, the spring will experience a corresponding predetermined linear displacement. In some embodiments, the properties of spring 512 and retainer 510 acting as a cable tensioner are selected to ensure that the automatic mast rotation release feature 500 is working within a desirable range of operating margins.

Figure 50:
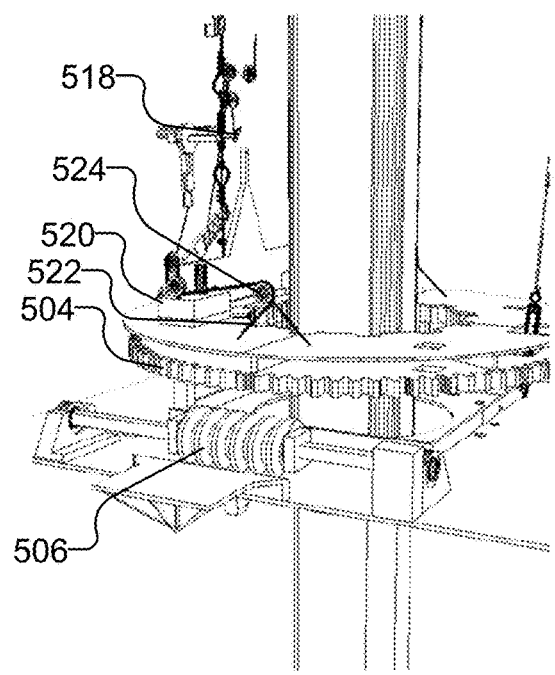
Figure 52:
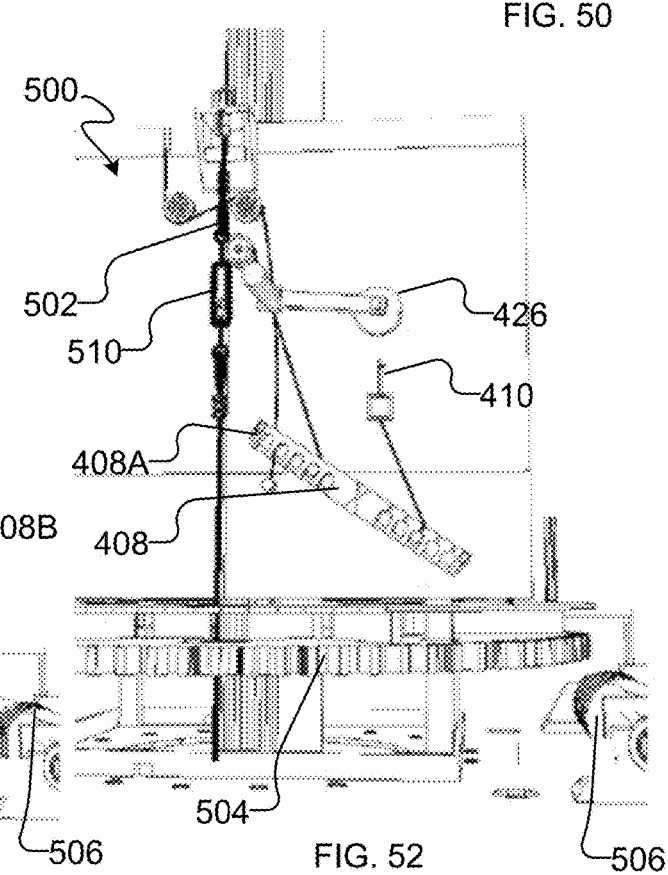

The actuation of mechanical switch 503 pulls pin 518 to release mast release weight 520, which by falling lifts mast cog 504 off of worm screw 506 via cable 522 and pulley 524, as shown by the raised position of mast cog 504 illustrated in FIGS. 50 and 52 as compared with its normal operating position illustrated in FIGS. 49 and 51. During normal operation, rotation of worm screw 506 is used to rotate mast cog 504 to thereby control the angle of rotation of mast 110. Mast cog 504 therefore constitutes a rotatable platform that can be rotated by an engagement member, exemplified by worm screw 506.

Figure 53:
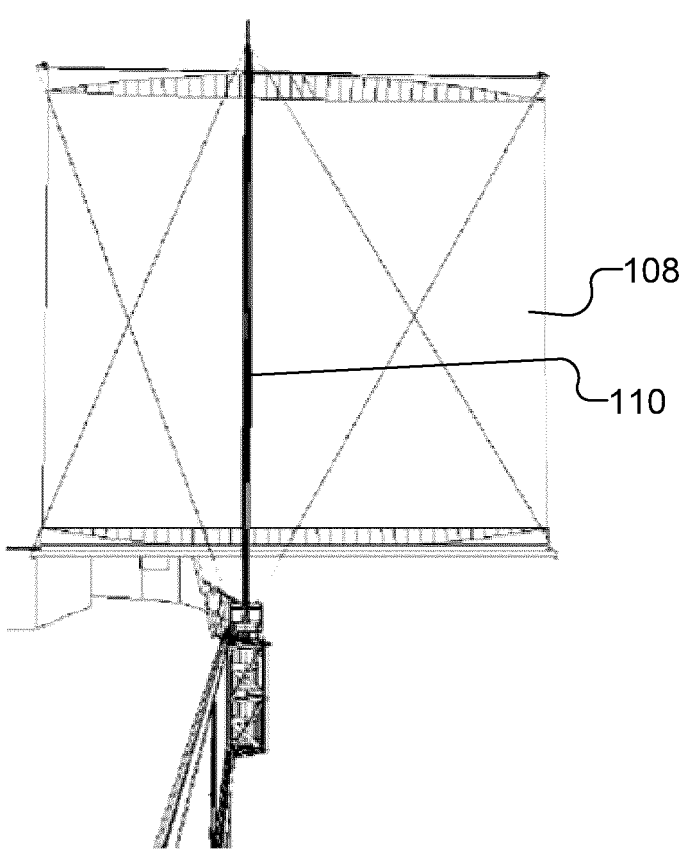
FIG. 53 shows the configuration of the mast and sail during normal operations.
Figure 54:
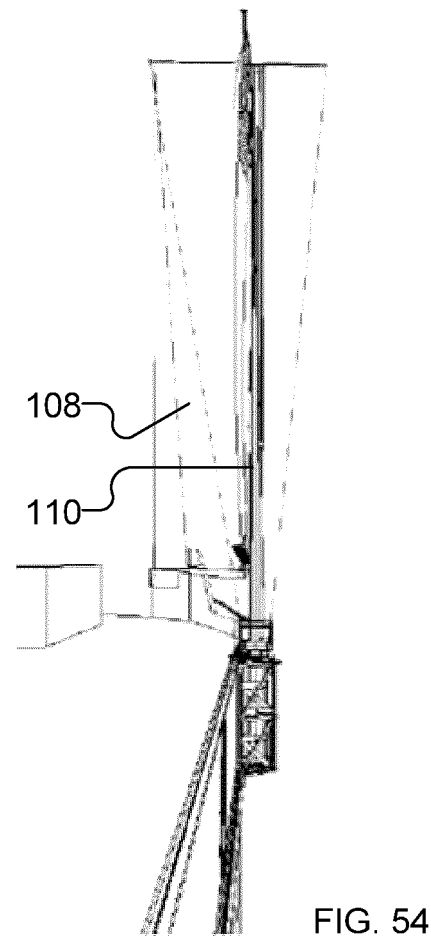
FIG. 54 shows the configuration of the mast and sail after the automatic mast rotation release safety feature has been activated.

Once mast cog 504 is free of worm screw 506 (which is ordinarily used to rotate mast 110), mast 110 is free to rotate, and because sail 108 is offset, one side of sail 108 will experience a greater wind force than the other side of sail 108, thereby forcing sail 108 to turn parallel to the wind, rapidly decreasing the wind forces applied to sail 108 and mast 110, as shown by the differences in the position of sail 108 in the ordinary operating configuration shown in FIG. 53 versus the position after automatic mast rotation release feature 500 has been activated, as shown in FIG. 54.

In some embodiments, including the illustrated embodiment, automatic mast rotation release feature 500 is configured to automatically activate automatic reefing sail safety feature 400 to fully reef sails 108 if automatic mast rotation release feature 500 is activated. As best seen in FIGS. 51 and 52, automatic mast rotation release feature 500 includes a cable 516 that is pulled when switch 503 is actuated. Cable 516 is coupled to switch 503 (FIGS. 45-48) and to first end 408A of variable lever 408, so that when switch 503 is actuated by mast strengthener cable 502, cable 516 is pulled and irreversibly actuates variable lever 408, releasing drum latch 410. Because cable 516 remains under tension because switch 503 remains in its actuated configuration, drum latch 410 is not able to re-engage with securing recess 424 and top boom cable drum 422 is free to continue turning until sail 108 is fully reefed. This embodiment provides additional protection to sail 108 and mast 110 by fully reducing the sail area exposed to wind to zero in the event that mast rotation release feature 500 is activated by an extreme wind event. In some embodiments, because upper boom 106 may fall vigorously when top boom cable drum 422 is free to rotate, a friction strap 526 (FIG. 47) can be wound around a bob 528 on the back of top boom cable drum 422, which tightens as the mast release weight 520 drops to slow the descent of upper boom 106.

In some embodiments, appropriate shielding and weatherproofing can be provided to prevent components of sail units 102 (e.g. cables and levers on the control panel) from becoming damaged due to exposure to ocean weather conditions.

The function of auxiliary sail system 100 when used as described above is to assist the engines of ship 101 and save fuel. Thus, the margin of the operation of sail system 100 is well within the limits of mast failure or ship capsize, which may lower the lead time from the beginning of development through testing to sales.

Figure 55:
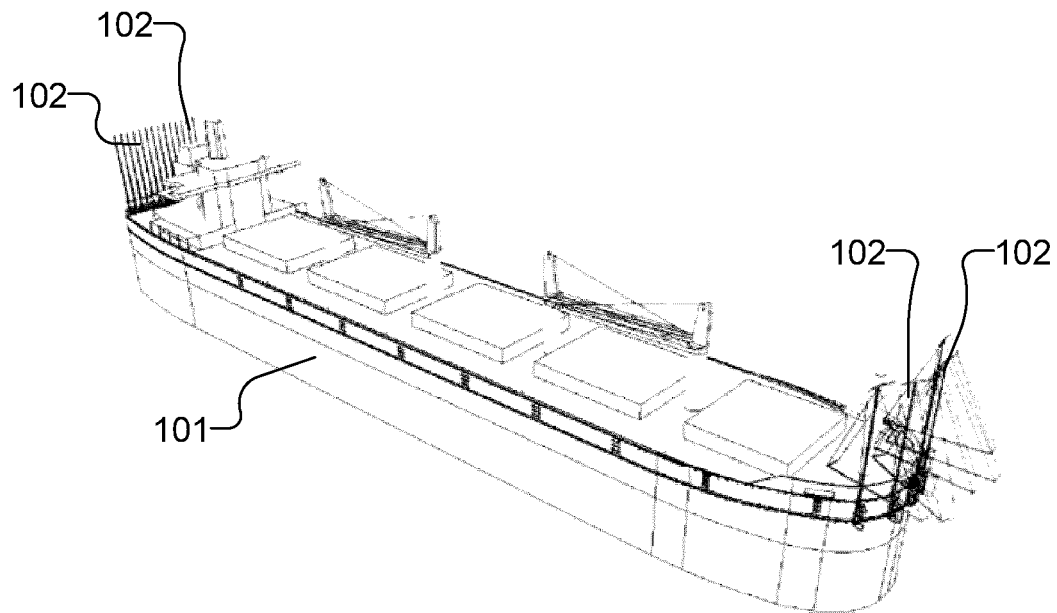
FIG. 55 shows a configuration of the sail units that is suitable to allow the ship to pass through a narrow space, such as the Panama Canal.

Sail units 102 can also be adjusted in any suitable manner to allow ship 101 to be used as any normal ship. For example, FIG. 55 illustrates a configuration of sail units 102 in which sail units 102 have been moved to the bow 124 and stern 122 of ship 101, with upper and lower booms 106, 104 placed into a vertical configuration, so that both sides of ship 101 are clear and ship 101 can pass through a narrow space, e.g. the Panama or Suez Canal. In some alternative embodiments, upper and lower booms 106, 104 can be lowered to the deck or loaded onto storage carts.

Maintenance of various parts of sail system 100 can be done while ship 101 is en route. Because sail system 100 is only an auxiliary sail system, it is not critical to the progress of ship 101, which means that repairs can be scheduled for calm weather or port, and need not be completed immediately. Ship 101 can still continue its journey, potentially more slowly, if some or all sail units 102 fail.

Suitable materials for making the various components of auxiliary sail system 100 can be selected by those skilled in the art. For example, in some embodiments, mast 110 and lower and upper booms 104, 106 may be made of aluminum. In such embodiments, to avoid aluminum/steel chemical reactions, resin barriers can be used. In alternative embodiments to avoid aluminum/steel chemical reactions, a design of sail system 100 that uses all steel e.g. for mast 110 and lower and upper booms 104, 106, could be used. In some such embodiments, the mast and booms would be triangular open frames such as those used in cranes and broadcast pylons. In alternative embodiments and as a more sustainable material, in some embodiments mast 110 and/or lower and upper booms 104, 106 could be made from timber, for example laminated sitka spruce, which could be produced to effective lengths.

The construction and connection of the various components of auxiliary sail system 100 would be within the expected knowledge of the person of ordinary skill in the art. In one example embodiment, cable fixing points are made by chain link traps using a primary locking plate, a secondary locking plate, and an 'R' clip to secure to their points of use, which allows rigging/de-rigging to be done manually by as few as two persons, without tools. However, any suitable engagement mechanism can be used in alternative embodiments.

While an example embodiment of a rail-mounted auxiliary sail system 100 has been described in conjunction with the example embodiments of automatic mechanical safety devices described herein, in alternative embodiments, other mounting systems could be used to affix appropriate sail units to a ship. For example, in some embodiments, the masts can be mounted at fixed points, and a derigging system can be provided to move the sail unit out of the way, for example to permit loading and unloading of cargo in port. In some embodiments, the masts can be mounted on and movable with respect to a rail system, and a motor can be provided to move each sail unit along the rail system.

In still a further alternative embodiment, a 'curtain rail' mounting system can be used, and a fixed cable can extend around the ship and be used to move the sail units along the rail system. In some such embodiments, the fixed cable can be moved using a motorised capstan, and the sail units can be lashed to the fixed cable in any suitable manner so that movement of the cable will draw the sail units along the rail system.

In still a further embodiment, a 'pocket' mounting system can be used to secure some of the sail units 102, in which the mast is secured within a pocket that is in turn secured to the side of the ship.

While a number of exemplary aspects and embodiments have been discussed above, those of skill in the art will recognize certain modifications, permutations, additions and sub-combinations thereof. It is therefore intended that the following appended claims and claims hereafter introduced are interpreted to include all such modifications, permutations, additions and sub-combinations as are consistent with the broadest interpretation of the specification as a whole.

The invention claimed is:

1. A ship-mounted auxiliary sail system comprising:
a rail system extending about at least a portion of a perimeter of a deck of the ship;
a plurality of sail units mountable on the rail system, each one of the plurality of sail units having a mast, each one of the plurality of sail units including the respective mast of the each one of the plurality of sail units being movable along the rail system; and
a plurality of spaced apart fixed mounting points provided on the rail system for fixing the plurality of sail units to a hull of the ship for use, each one of the plurality of spaced apart fixed mounting points being configured to receive and secure a corresponding one of the plurality of sail units.

2. A ship-mounted auxiliary sail system as defined in claim 1, wherein adjacent ones of the plurality of spaced apart fixed mounting points on a first side of the ship are spaced apart by a spacing distance.

3. A ship-mounted auxiliary sail system as defined in claim 2, comprising a drive rope for moving the plurality of sail units along the rail system.

4. A ship-mounted auxiliary sail system as defined in claim 3, further comprising a storage rope for positioning at least some of the plurality of sail units in a stowage configuration.

5. A method of using a ship-mounted auxiliary sail system as defined in claim 4, the method comprising using webbing loops to cinch the plurality of sail units to the drive rope or the storage rope.

6. A method as defined in claim 5, wherein the drive rope is marked with distance indicators at spaced apart intervals corresponding to the spacing distance and the storage rope is marked with distance indicators at spaced apart intervals corresponding to a stowage spacing of the plurality of sail units, and wherein the webbing loops are used to cinch the plurality of sail units to the drive rope or the storage rope at at least some of the distance indicators.

7. A ship-mounted auxiliary sail system as defined in claim 1, comprising an automatic reefing sail safety system for a square-rigged roller blind sail, the automatic reefing sail safety system comprising:
a flex detecting cable positioned to detect flex of a component of the square-rigged roller blind sail due to extreme wind events;
a damping member positioned to absorb movement of the flex detecting cable during sailing operations, the damping member being selected to transmit movement of the flex detecting cable to a variable lever during extreme wind events;
the variable lever positioned to be actuated by the damping member during extreme wind events;
a drum latch configured to be actuated by actuation of the variable lever, wherein the drum latch is biased in a retaining configuration until the retaining member is actuated by actuation of the actuating lever;
a rotatable top boom cable drum having a hoisting cable wound therearound for raising and lowering a top boom of the square-rigged roller blind sail, an outer circumference of a portion of the rotatable top boom cable drum comprising an engaging element to engage with the drum latch when the drum latch is in the retaining configuration to thereby prevent rotation of the rotatable top boom cable drum; and
the rotatable top boom cable drum being rotatable to lower a top boom of the square-rigged roller blind sail by rotating a portion of the hoisting cable when the drum latch is actuated to a released configuration.

8. A ship-mounted auxiliary sail system as defined in claim 7, wherein the outer circumference of the rotatable top boom cable drum about which the hoisting cable is wound is equal to approximately $1/10^{th}$ of a height of a mast of the square-rigged roller blind sail.

9. A ship-mounted auxiliary sail system as defined in claim 7, wherein the damping member comprises an inertia drum that is connected to be rotated by movement of the flex detecting cable.

10. A ship-mounted auxiliary sail system as defined in claim 9, wherein the inertia drum rotates an actuator cog, and the actuator cog in turn rotates a rotating lever cog to raise an actuating lever during extreme wind events, the actuating lever being connected to actuate the variable lever.

11. A ship-mounted auxiliary sail system as defined in claim 10, wherein the actuating lever is connected to a first end of the variable lever and the drum latch is connected to a second end of the variable lever so that when the first end of the variable lever is actuated by the actuating lever, the drum latch is actuated to the released configuration.

12. A ship-mounted auxiliary sail system as defined in claim 7, wherein the flex detecting cable extends along the top boom.

13. A ship-mounted auxiliary sail system as defined in claim 1 comprising an automatic mast rotation release system, the automatic mast rotation release system comprising:
- a rotatable platform;
- a mast mounted to the rotatable platform;
- an engagement member engaged with and configured to rotate the rotatable platform;
- a mast strengthener cable connected to the mast for detecting extreme wind events;
- a mechanical switch configured to be actuable in response to the application of a predetermined level of force to the mast strengthener cable; and
- a mast releasing weight configured to be initially in a first position, and movable to a second position upon actuation of the mechanical switch to lift the rotatable platform out of engagement with the engagement member to thereby permit the rotatable platform to freely rotate.

14. A ship-mounted auxiliary sail system as defined in claim 13, comprising a projecting tab for actuating the mechanical switch, wherein the projecting tab and a spring supporting the projecting tab are contained within a retainer that is configured to transfer force applied by the mast strengthener cable to the spring to cause the projecting tab to actuate the mechanical switch when the predetermined level of force is applied to the mast strengthener cable.

15. A ship-mounted auxiliary sail system as defined in claim 13, wherein the mast releasing weight is initially supported in position by a pin positioned to release the mast-releasing weight when the mechanical switch is actuated.

16. A ship-mounted auxiliary sail system as defined in claim 13, wherein the mast strengthener cable is further connected to activate an automatic reefing sail system for a square-rigged roller-blind sail when the mechanical switch is actuated, the automatic reefing sail system comprising:
- a flex detecting cable positioned to detect flex of a component of the square-rigged roller blind sail due to extreme wind events;
- a damping member positioned to absorb movement of the flex detecting cable during sailing operations, the damping member being selected to transmit movement of the flex detecting cable to a variable lever during extreme wind events;
- the variable lever positioned to be actuated by the damping member during extreme wind events;
- a drum latch configured to be actuated by actuation of the variable lever, wherein the drum latch is biased in a retaining configuration until the drum latch is actuated by actuation of the actuating lever;
- a rotatable top boom cable drum having a hoisting cable wound therearound for raising and lowering a top boom of the square-rigged roller blind sail, an outer circumference of a portion of the rotatable top boom cable drum comprising an engaging element to engage with the drum latch when the drum latch is in the retaining configuration to thereby prevent rotation of the rotatable top boom cable drum; and
- the rotatable top boom cable drum being rotatable to lower a top boom of the square-rigged roller blind sail by rotating a portion of the hoisting cable when the drum latch is actuated to a released configuration.

17. A ship-mounted auxiliary sail system defined in claim 13, wherein the mechanical switch is connected to actuate a variable lever that releases a drum latch from engagement with a rotatable top boom cable drum when the mechanical switch is actuated, the rotatable top boom cable drum being positioned to rotate a hoisting cable for raising and lowering a top boom of a sail supported by the mast, to thereby allow the rotatable top boom cable drum to freely rotate to allow the top boom of the sail to fall and be placed in a fully lowered configuration.

18. A method of positioning a plurality of sail units at a plurality of spaced apart fixed mounting points for fixing the plurality of sail units to a hull of a ship for use as an auxiliary sail system for the ship, the method comprising the steps of:
- (a) loading a first one of the plurality of sail units on a rail system, the rail system extending about at least a portion of a deck of a ship;
- (b) securing the first one of the plurality of sail units to a drive rope;
- (c) using the drive rope to move the first one of the plurality of sail units towards a first one of the plurality of spaced apart fixed mounting points until the first one of the plurality of sail units has moved a predetermined spacing distance;
- (d) loading a second one of the plurality of sail units on the rail system;
- (e) securing the second one of the plurality of sail units to the drive rope;
- (f) using the drive rope to move the second one of the plurality of sail units towards a second one of the plurality of spaced apart fixed mounting points;
- repeating steps (d) through (f) for successive ones of the plurality of sail units, until a desired number of sail units have been loaded on the rail system and moved to a corresponding one of the plurality of spaced apart fixed mounting points; and
- securing each one of the plurality of sail units at the corresponding one of the plurality of fixed mounting points.

19. A method of clearing a plurality of sail units coupled to a plurality of spaced apart fixed mounting points of an auxiliary sail system for a ship from a first side of the ship, the method comprising the steps of:
- (a) advancing a second one of the plurality of sail units on a second side of the ship opposite to the first side to a storage distance from a first one of the plurality of sail units on the second side and securing the second one of the plurality of sail units in a storage configuration;
- (b) advancing a third one of the plurality of sail units on the second side of the ship to a storage distance from the second one of the plurality of sail units and securing the third one of the plurality of sail units in a storage configuration;
- (c) repeating step (b) for successive ones of the plurality of sail units on the second side of the ship until a desired portion of the second side of the ship has been cleared;
- (d) using a drive rope to move the plurality of sail units located on the first side of the ship towards the second side of the ship;

(e) advancing a first one of the plurality of sail units on the first side of the ship to a storage distance from a last one of the plurality of sail units on the second side of the ship and securing the first one of the plurality of sail units from the first side of the ship in a storage configuration; and (f) securing successive ones of the plurality of sail units from the first side of the ship a storage distance from the preceding one of the plurality of sail units from the first side of the ship in a storage configuration.

20. A method as defined in claim 19, wherein securing the plurality of sail units in the storage configuration comprises securing the plurality of sail units to a storage rope; wherein the storage rope is marked with distance indicators at spaced apart intervals corresponding to the storage distance and each one of the plurality of sail units is secured in the storage configuration at a corresponding one of the distance indicators on the storage rope.

* * * * *